(12) United States Patent
Inoue et al.

(10) Patent No.: US 8,405,916 B2
(45) Date of Patent: Mar. 26, 2013

(54) ZOOM LENS AND IMAGE PICKUP APPARATUS INCLUDING THE SAME

(75) Inventors: Chiaki Inoue, Utsunomiya (JP); Tsuyoshi Wakazono, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 12/852,372

(22) Filed: Aug. 6, 2010

(65) Prior Publication Data
US 2011/0051256 A1    Mar. 3, 2011

(30) Foreign Application Priority Data
Aug. 31, 2009 (JP) .................................. 2009-199921

(51) Int. Cl.
*G02B 15/14* (2006.01)
(52) U.S. Cl. ...................................... 359/687
(58) Field of Classification Search .................. 359/683, 359/687, 686
See application file for complete search history.

(56) References Cited

U.S. PATENT DOCUMENTS

| 7,206,137 | B2 | 4/2007 | Nakatani et al. |
| 7,286,304 | B1 | 10/2007 | Ohtake |
| 2008/0231969 | A1 | 9/2008 | Satori |
| 2009/0323198 | A1* | 12/2009 | Kusaka .......................... 359/687 |

* cited by examiner

*Primary Examiner* — Alicia M Harrington
(74) *Attorney, Agent, or Firm* — Canon U.S.A., Inc. IP Division

(57) ABSTRACT

A zoom lens includes, in order from an object side to an image side, a first lens unit having a positive refractive power, a second lens unit having a negative refractive power, an aperture stop, a third lens unit having a positive refractive power, and a rear group including at least one lens unit. During zooming from a wide angle end to a telephoto end, the first and third lens units move to the object side, the second lens unit moves to the image side, and the aperture stop moves to the object side along a convex path. Radii of curvature of object- and image-side lens surfaces of a lens closest to the object side in the second lens unit, focal lengths of the entire zoom lens at the wide angle end and the telephoto end, and focal lengths of the first and second lens units are set properly.

12 Claims, 21 Drawing Sheets

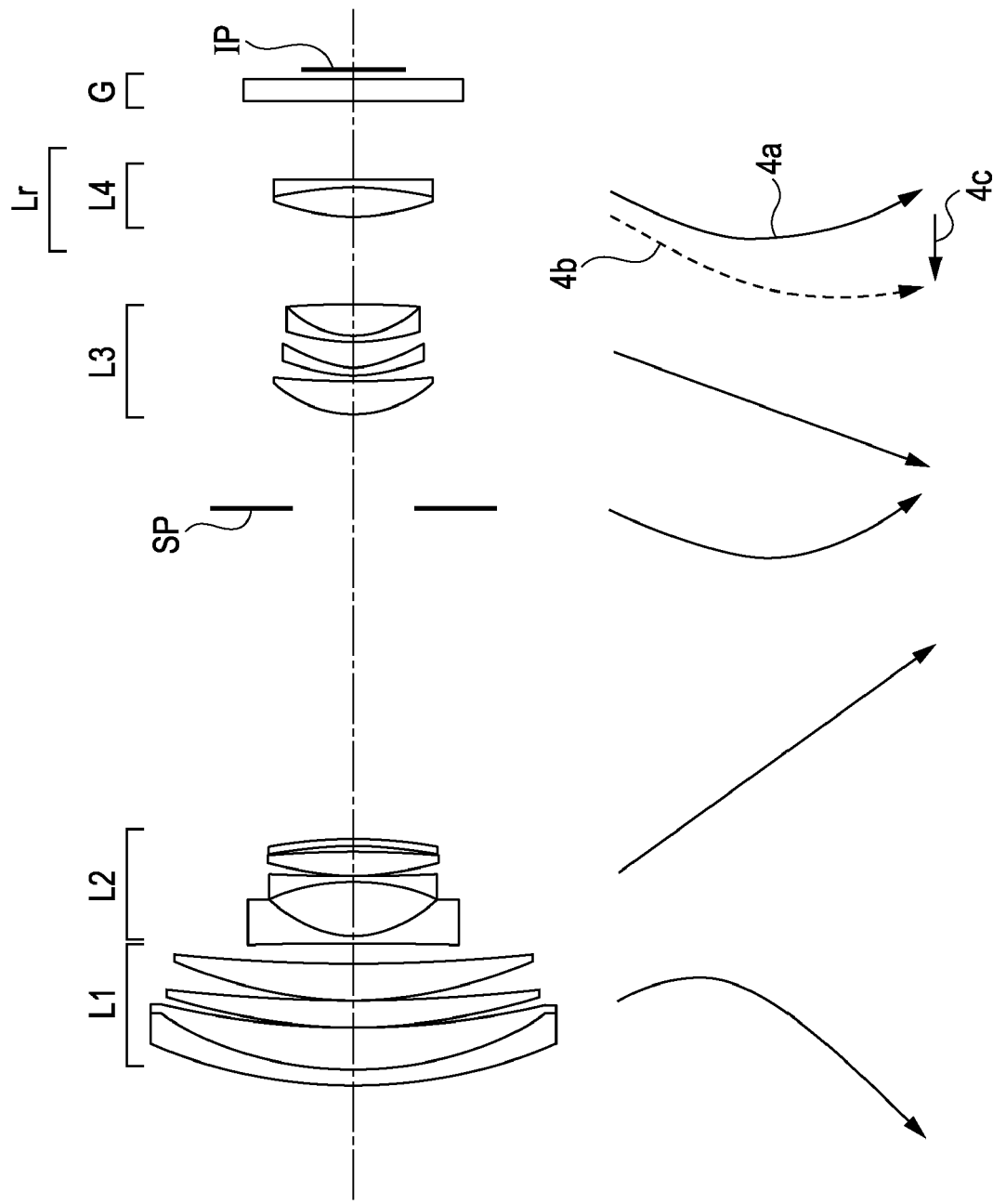

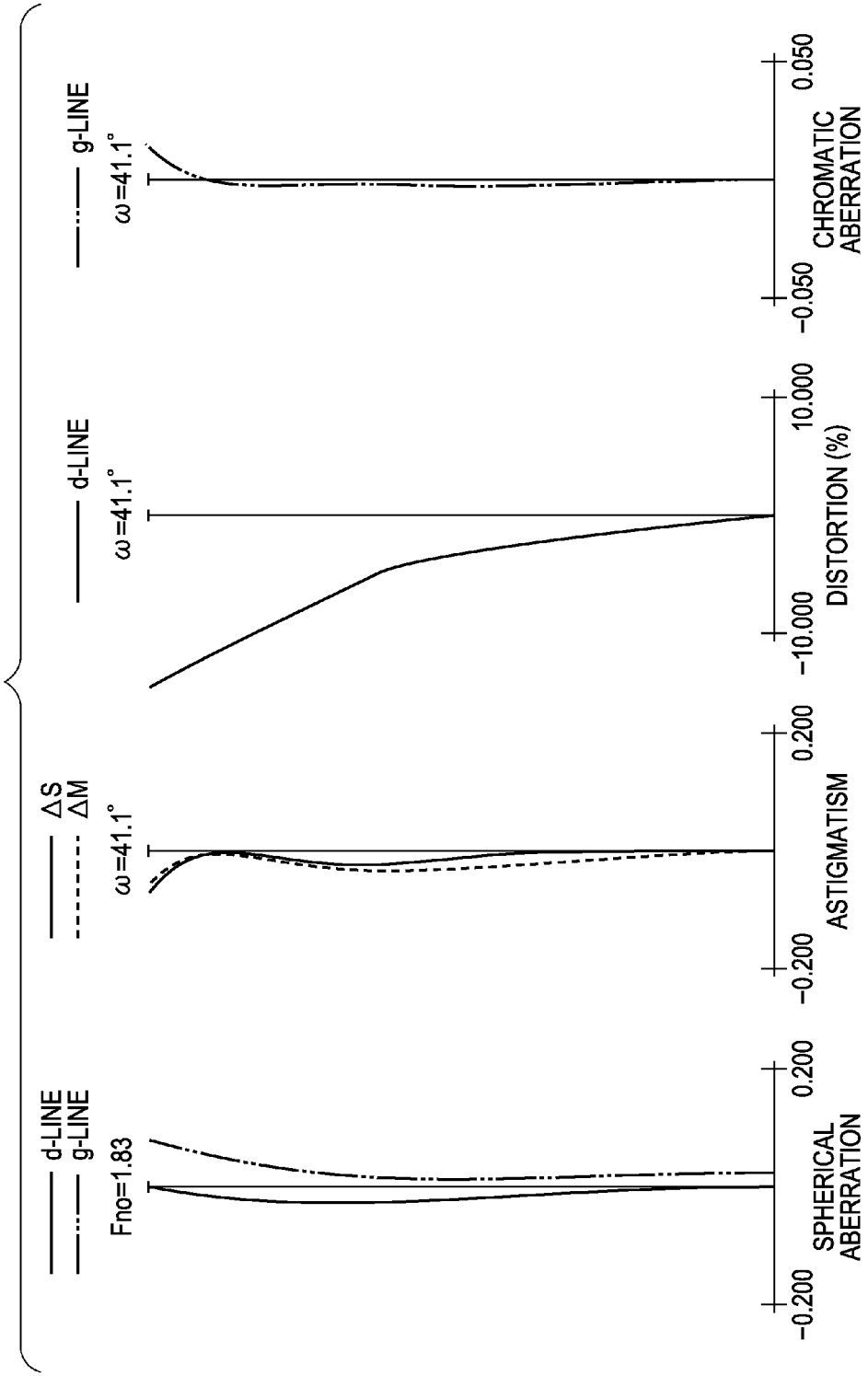

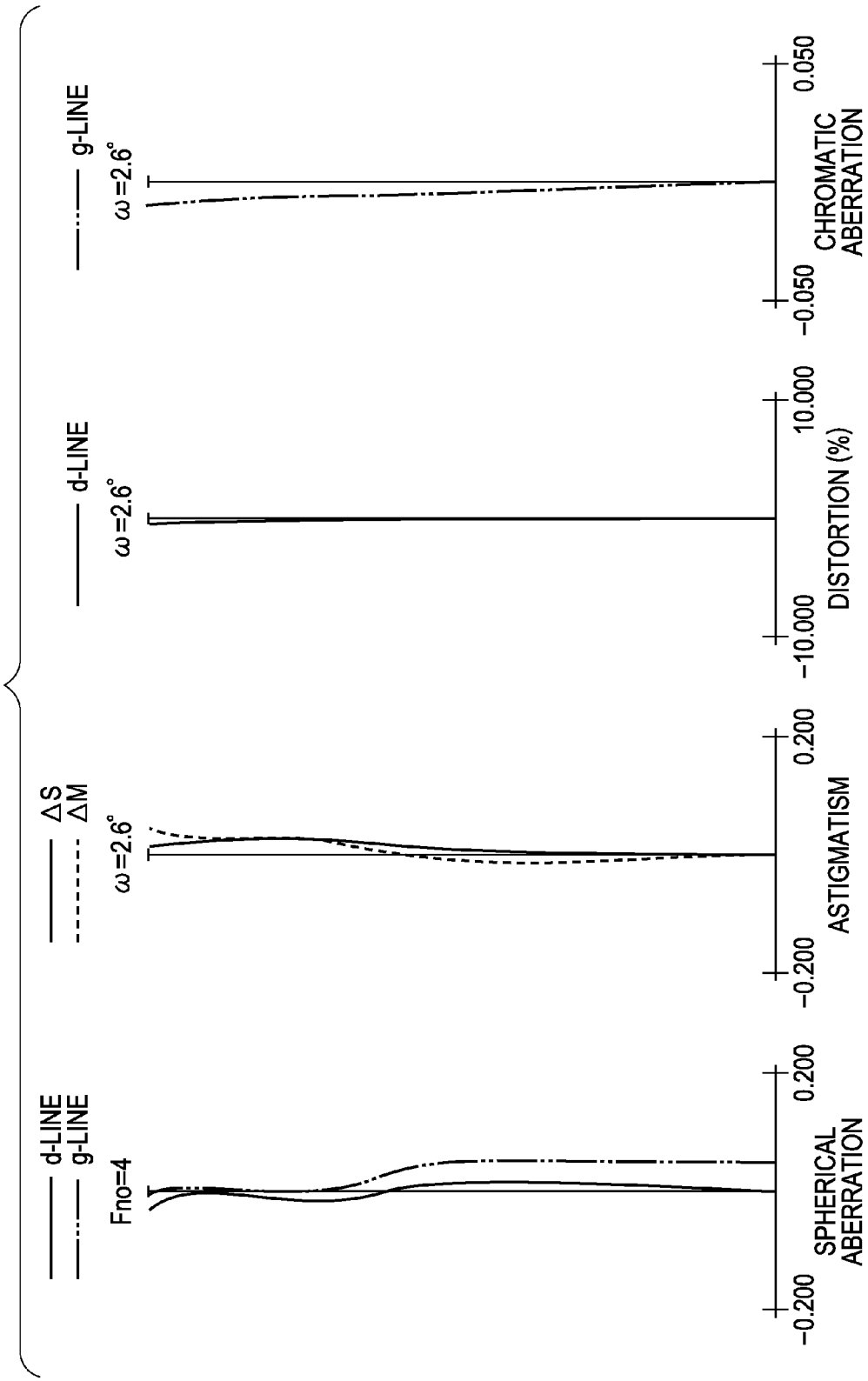

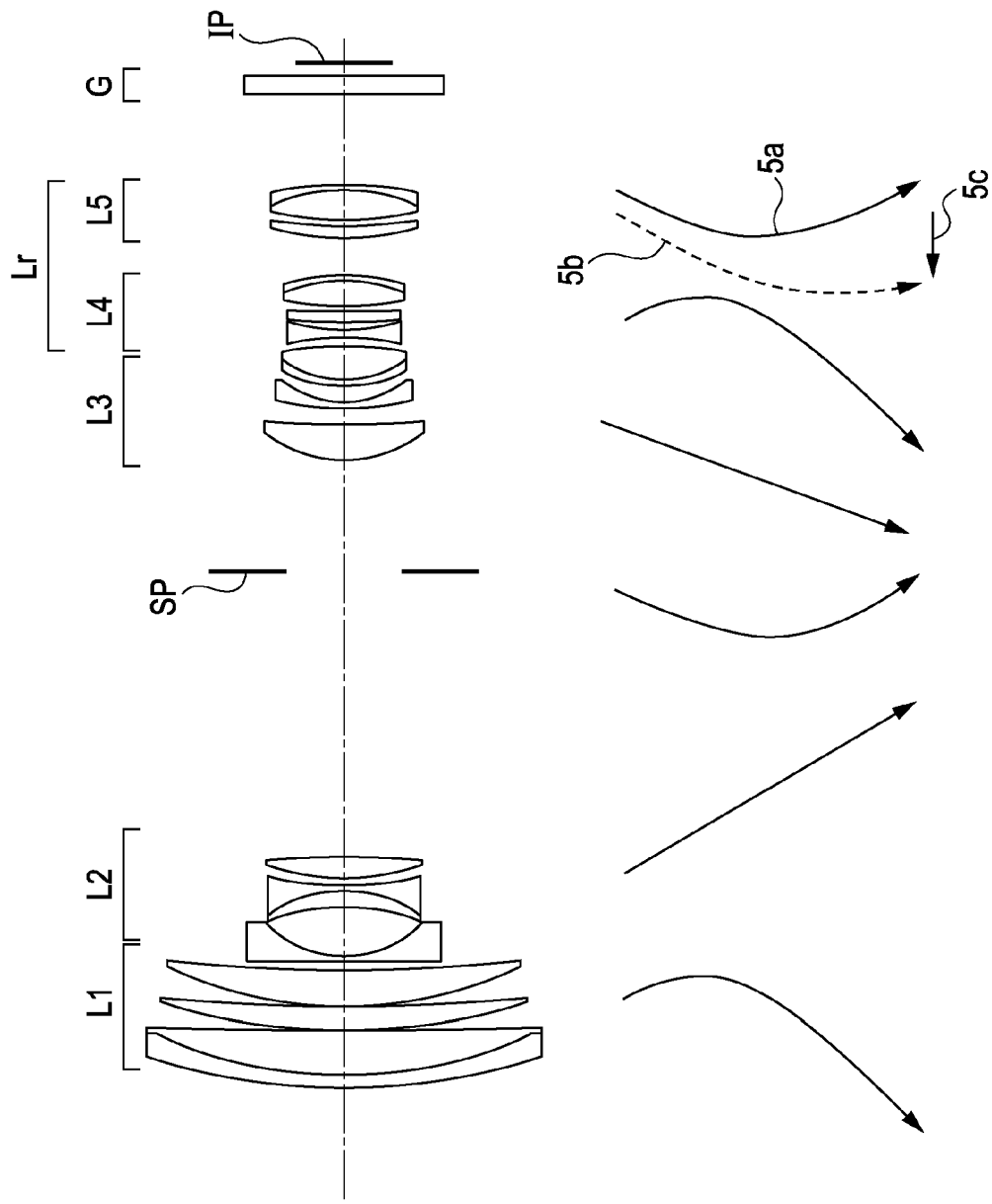

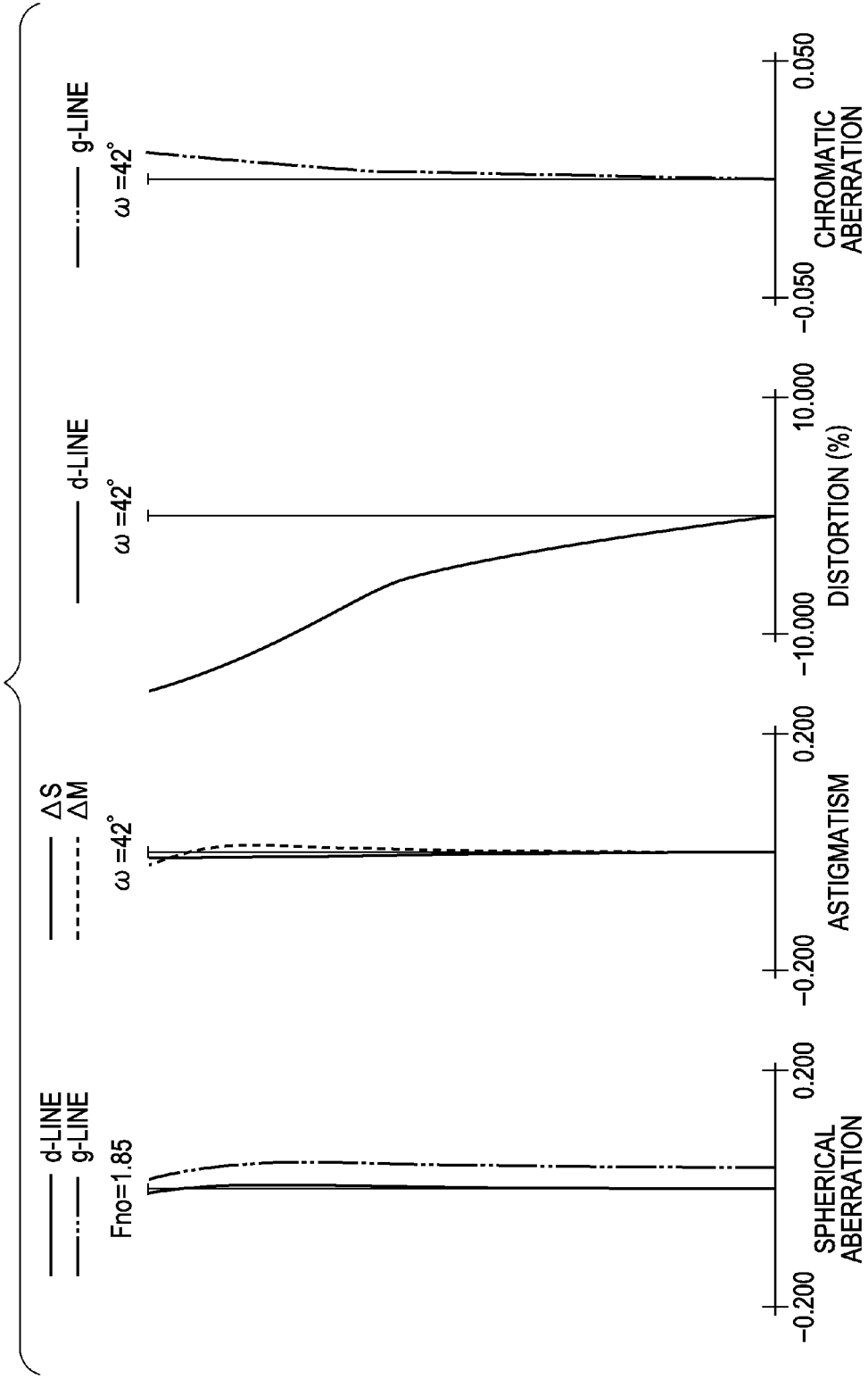

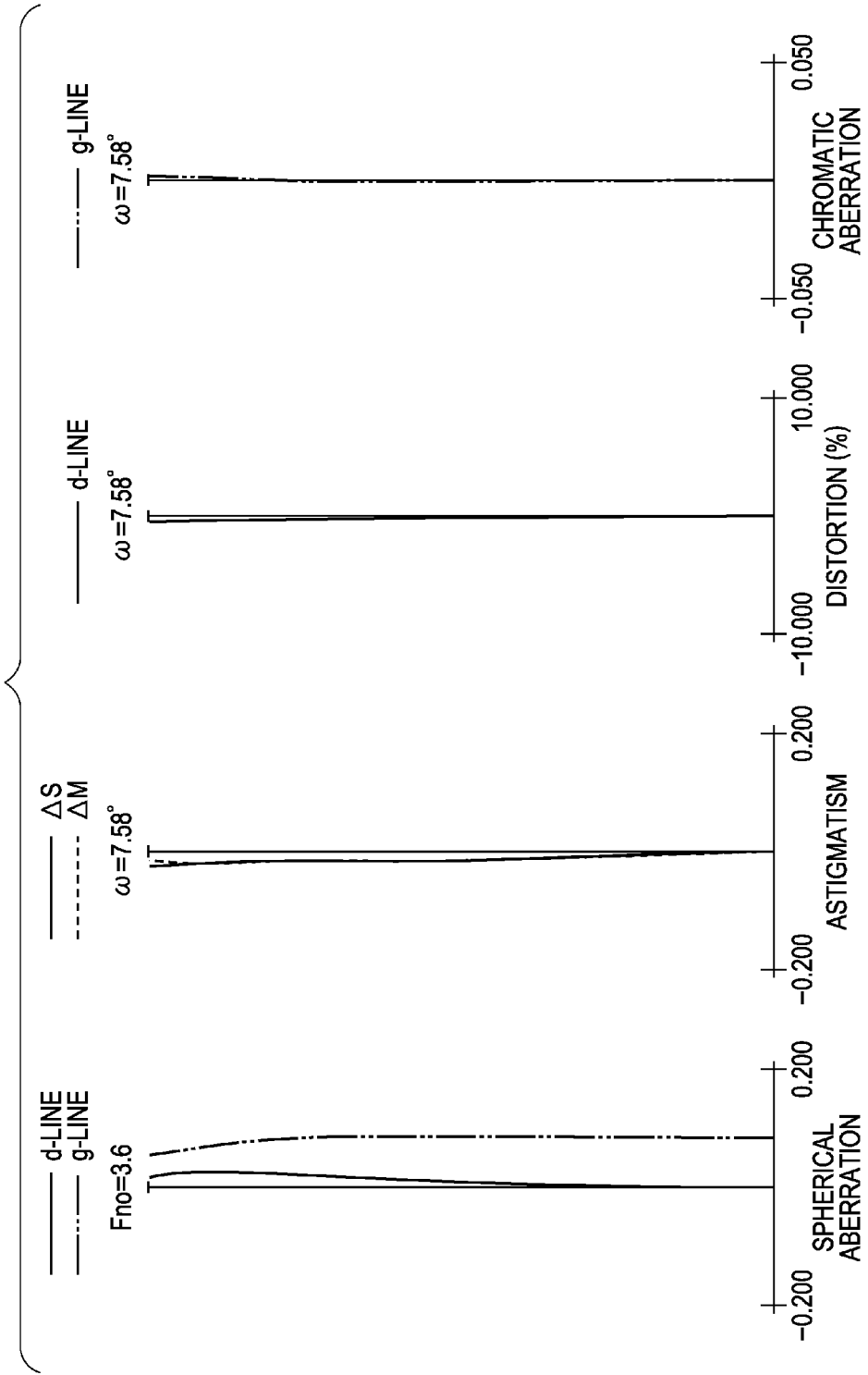

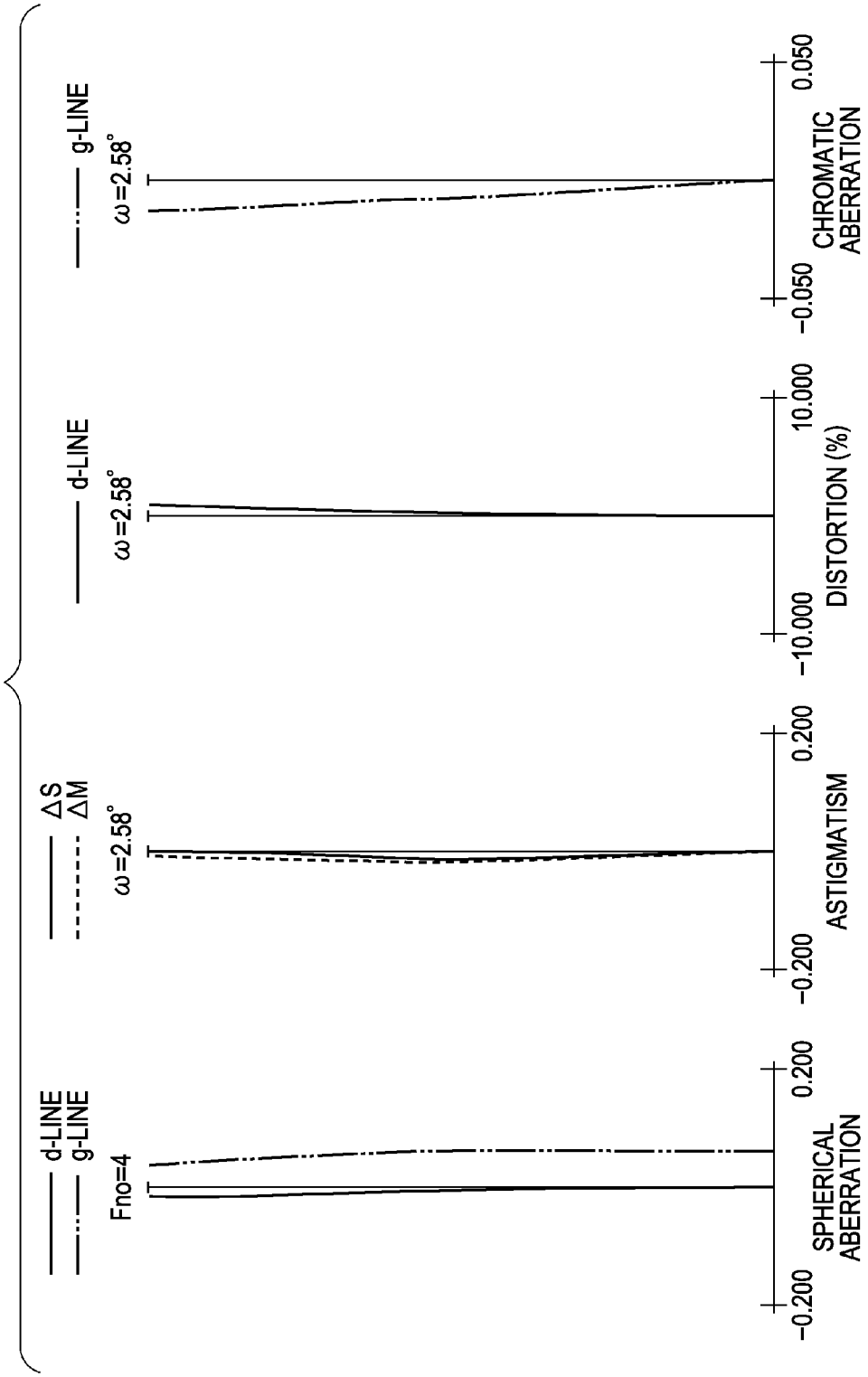

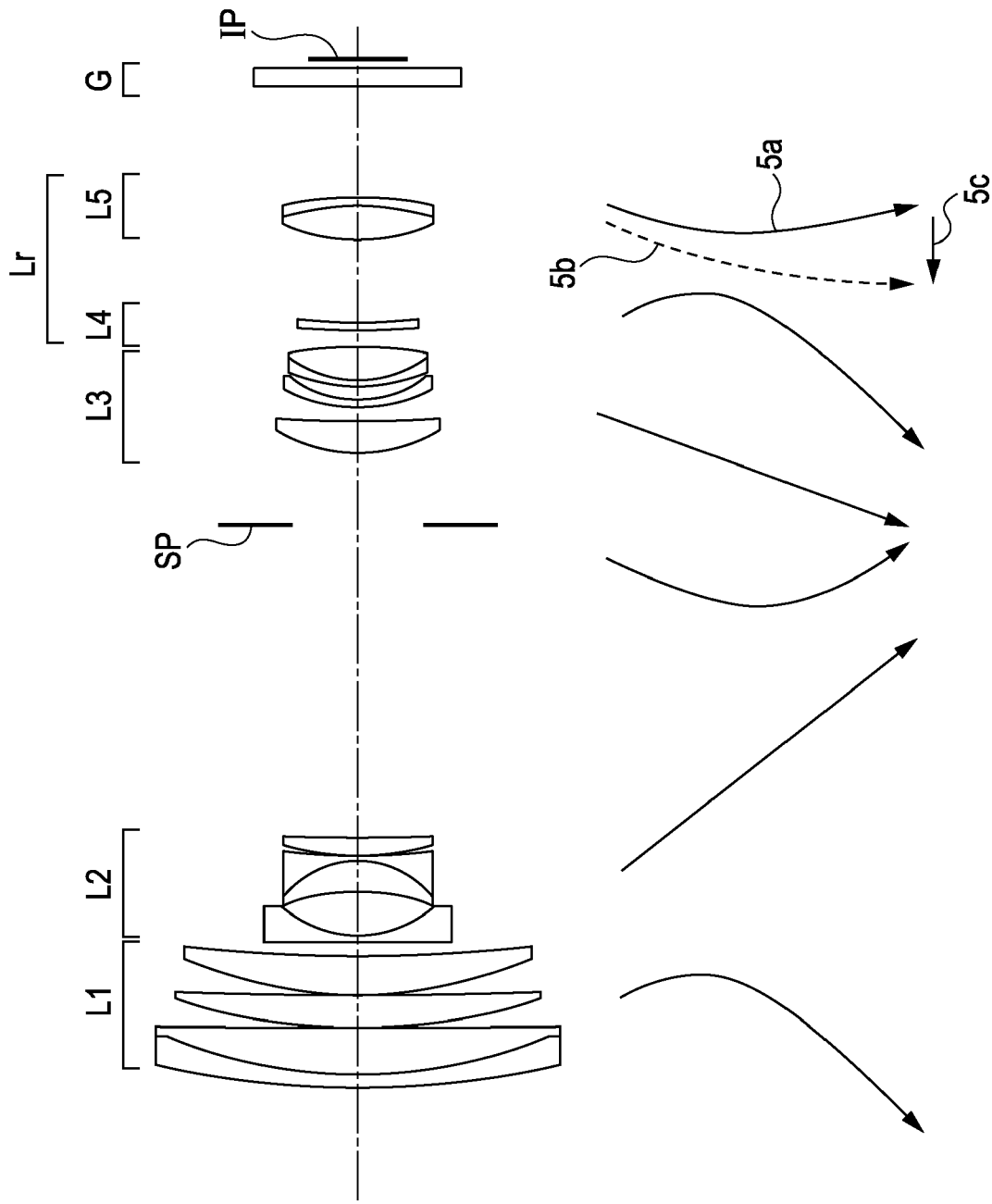

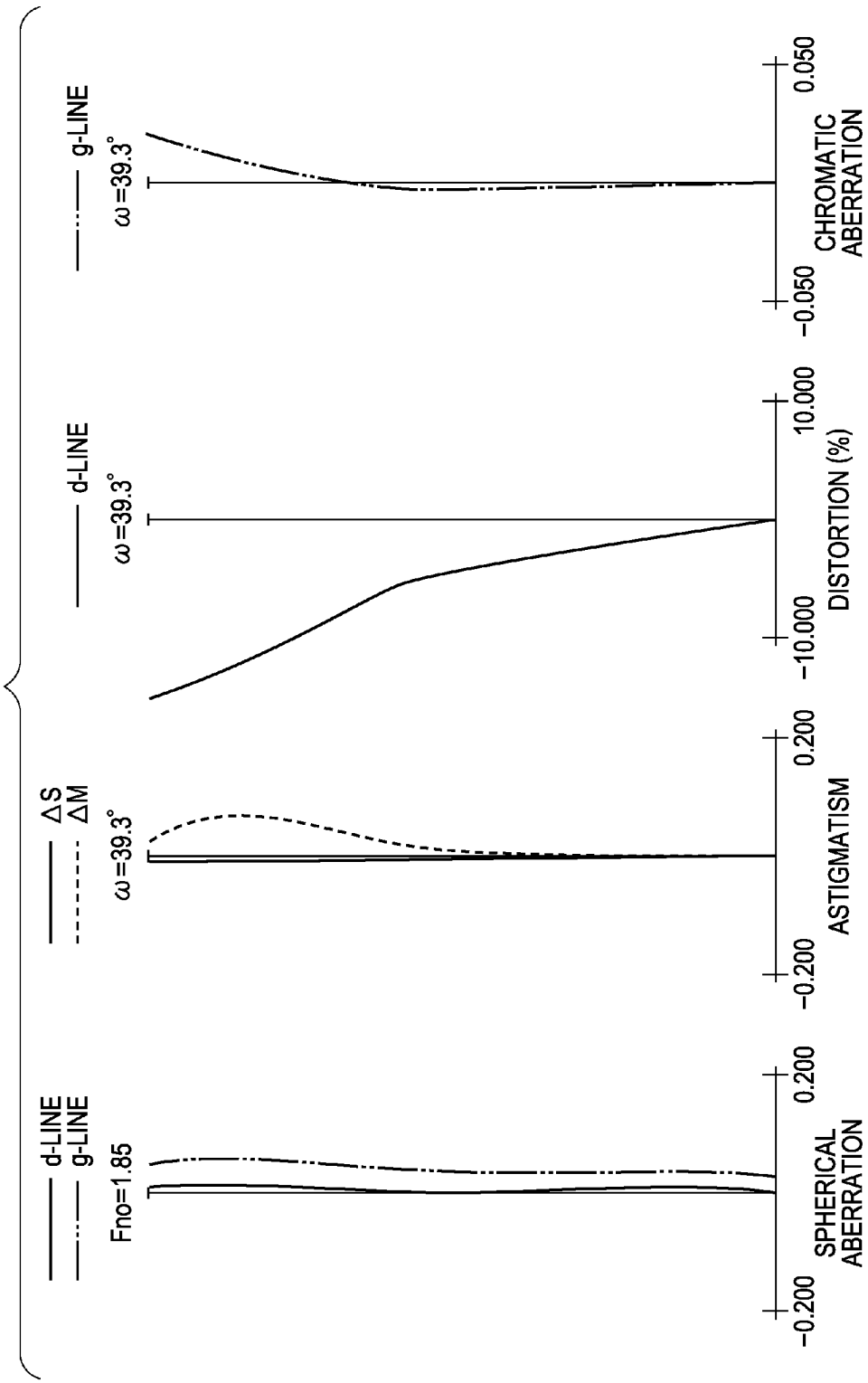

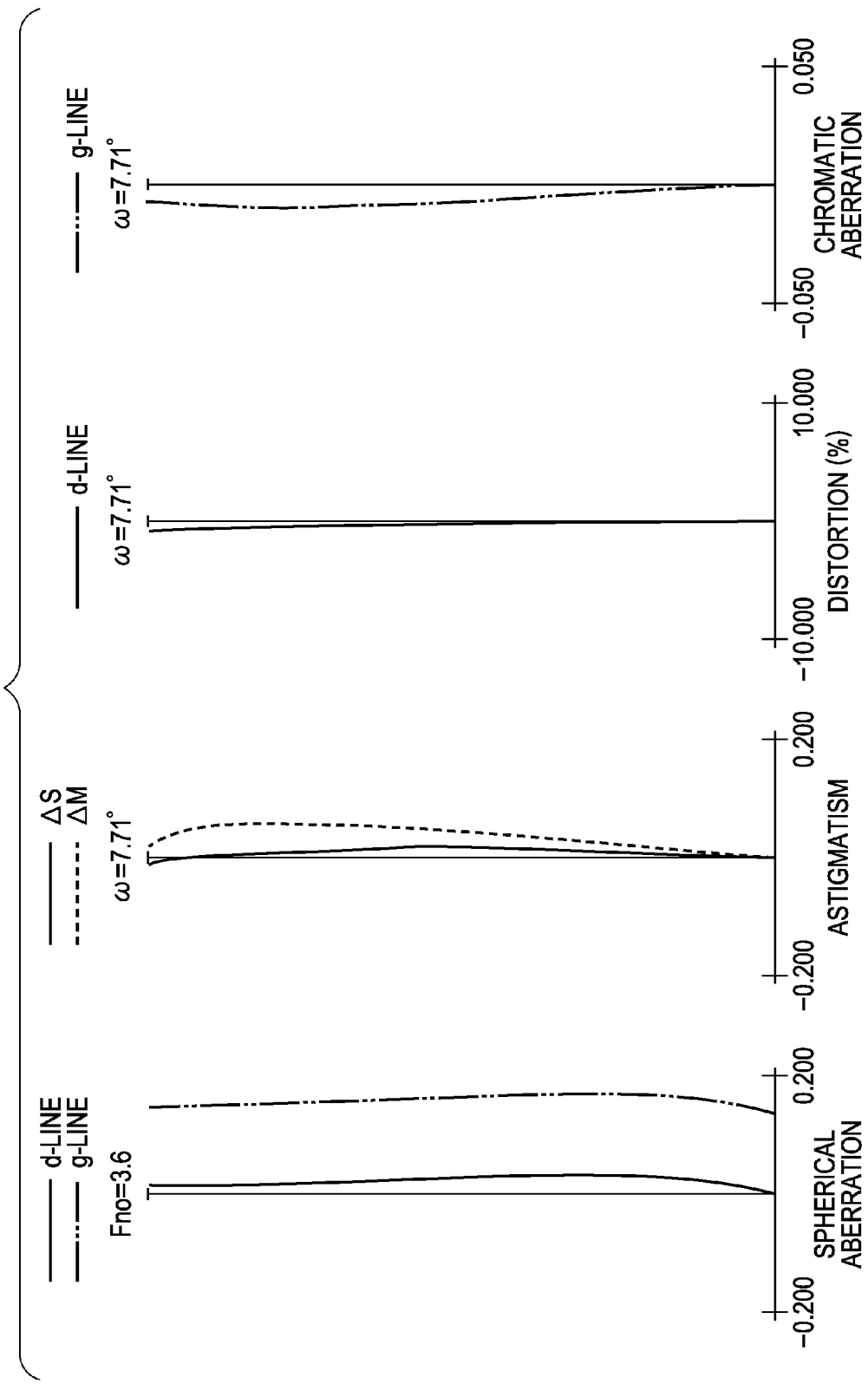

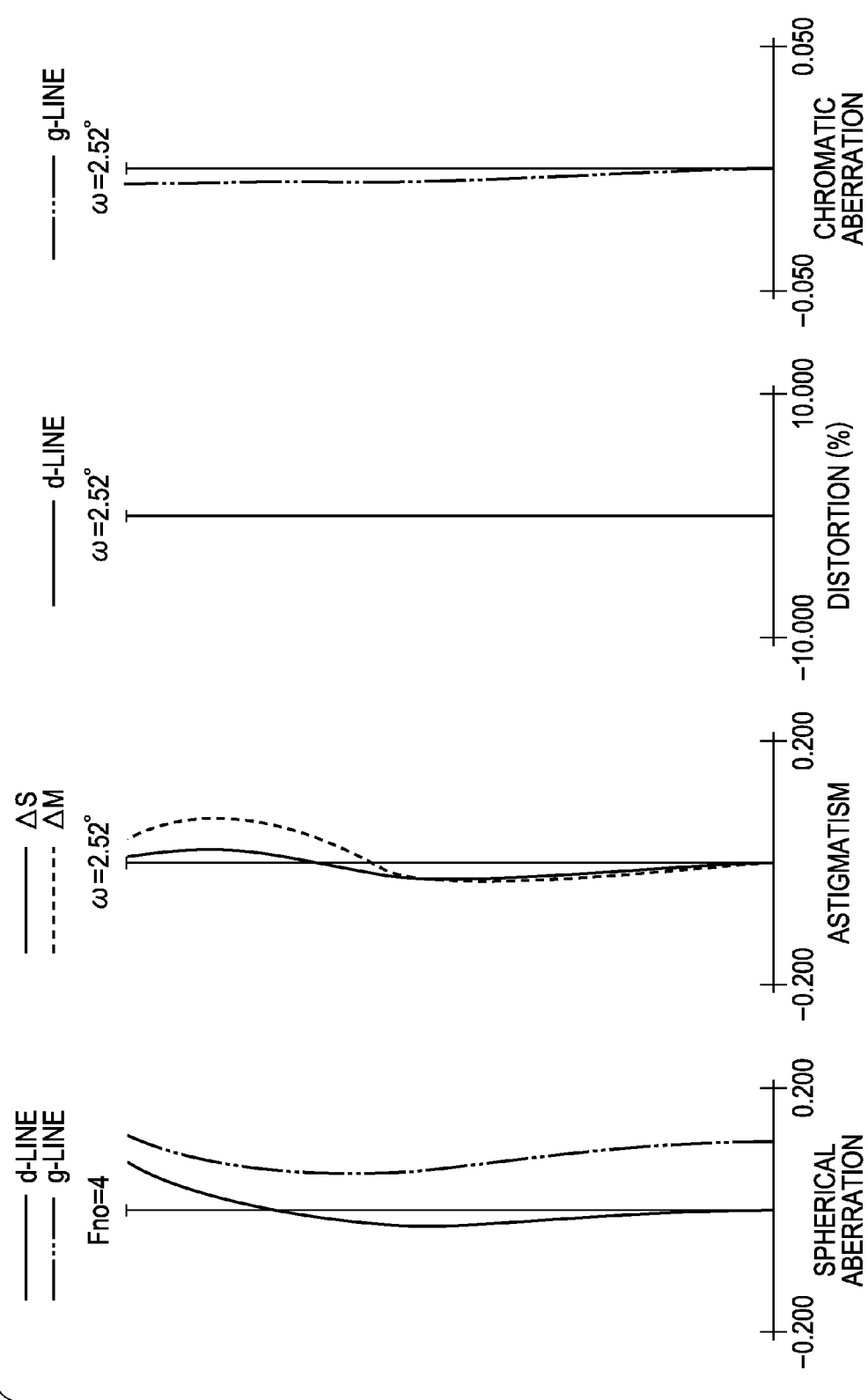

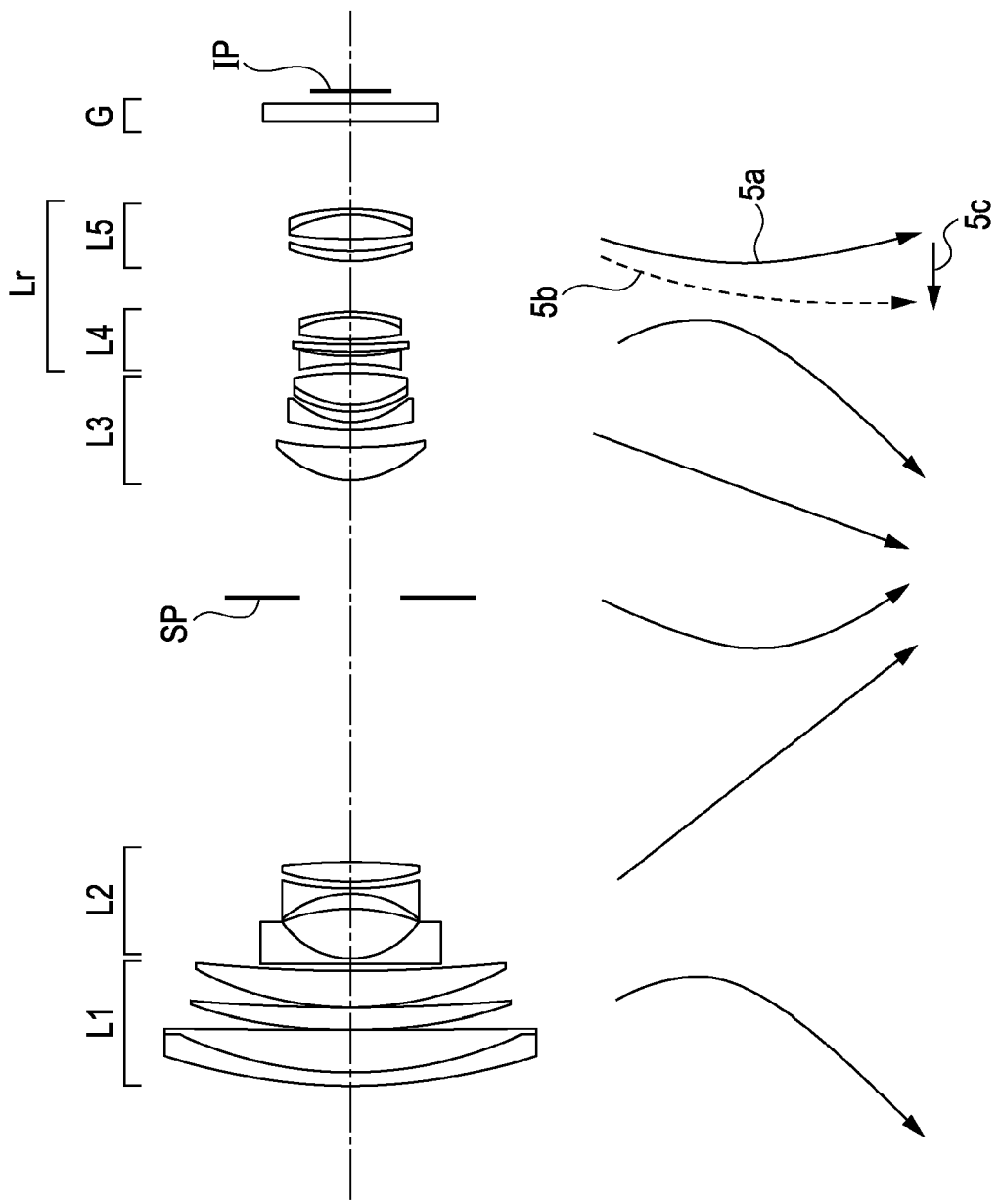

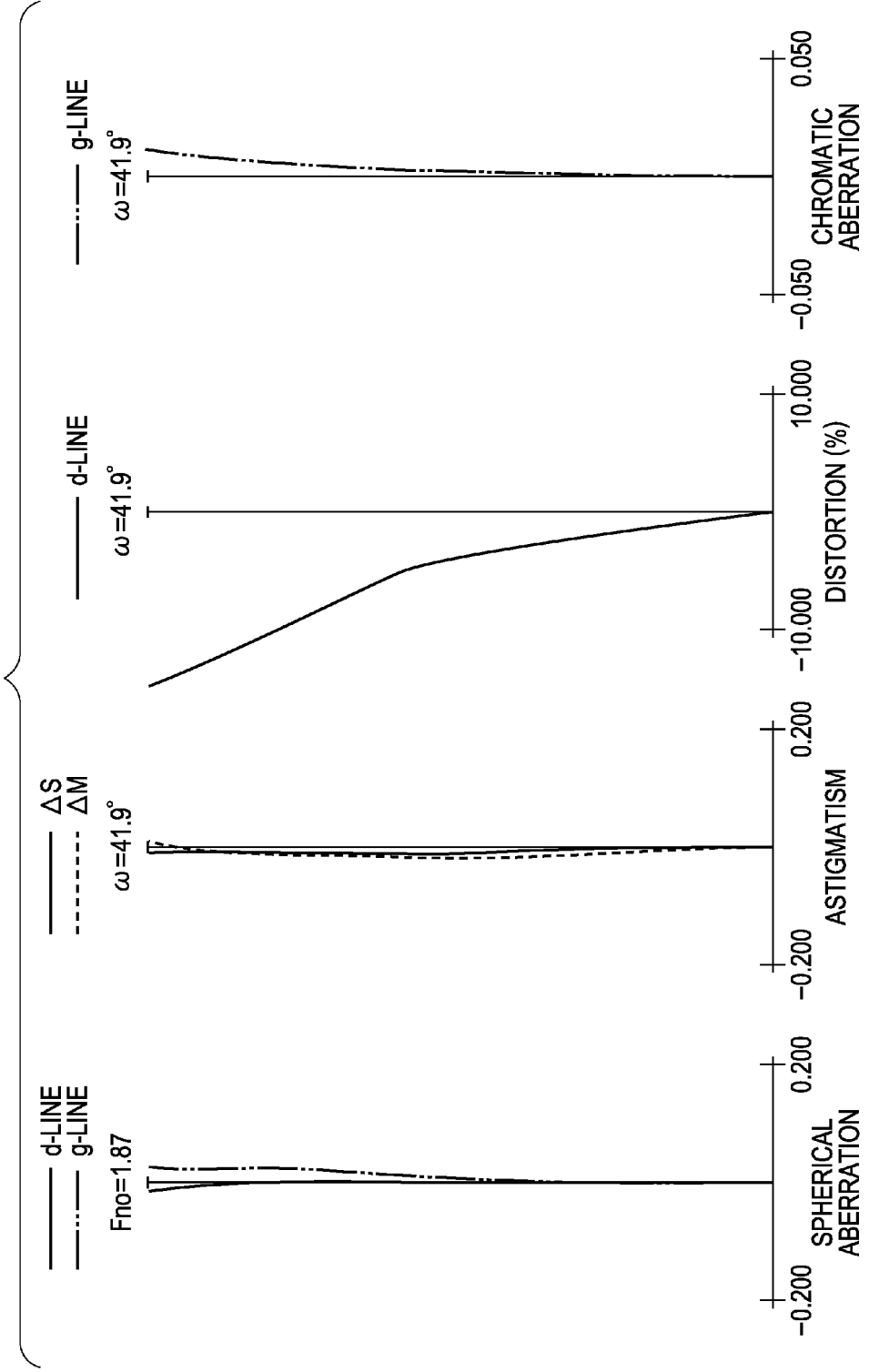

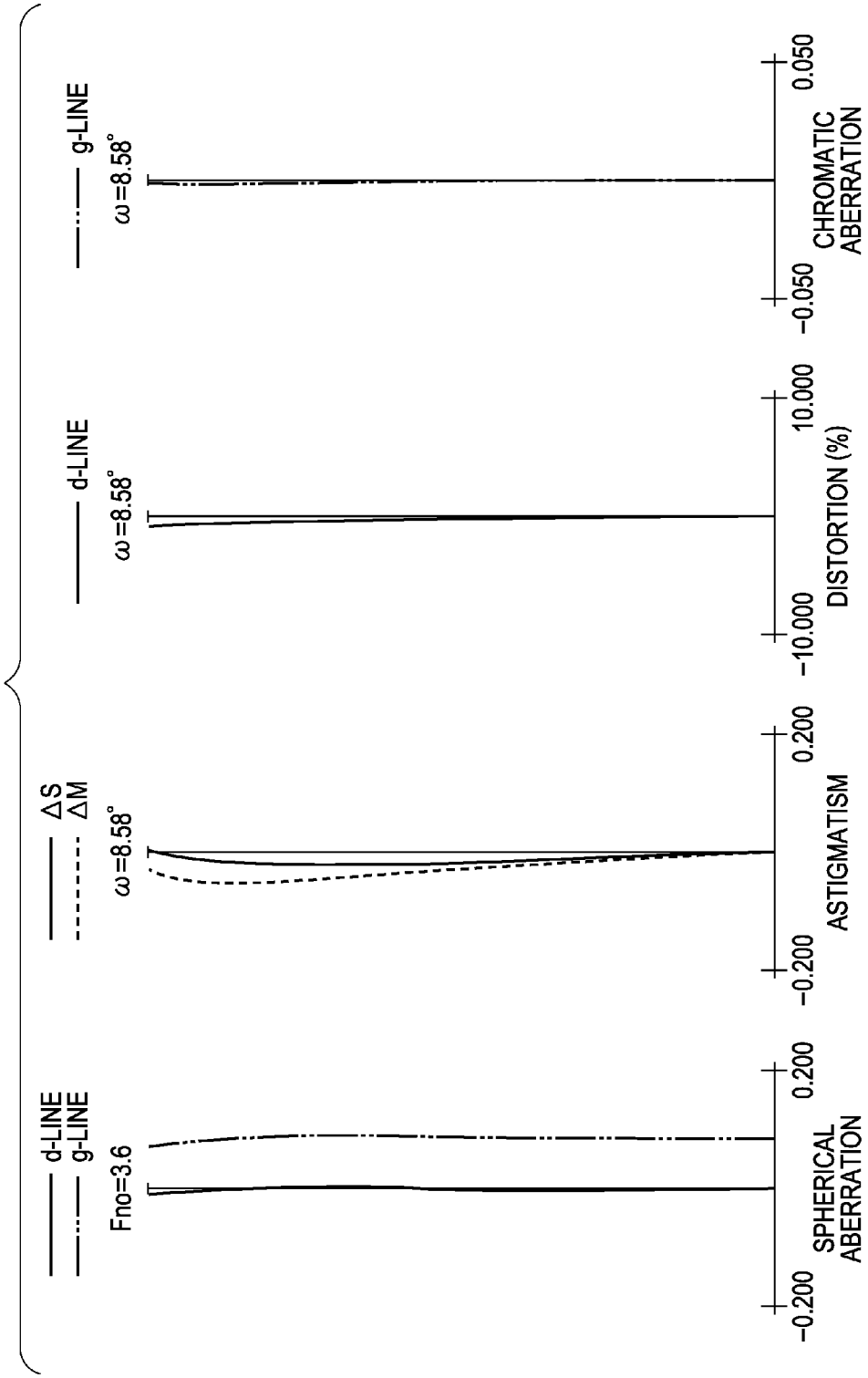

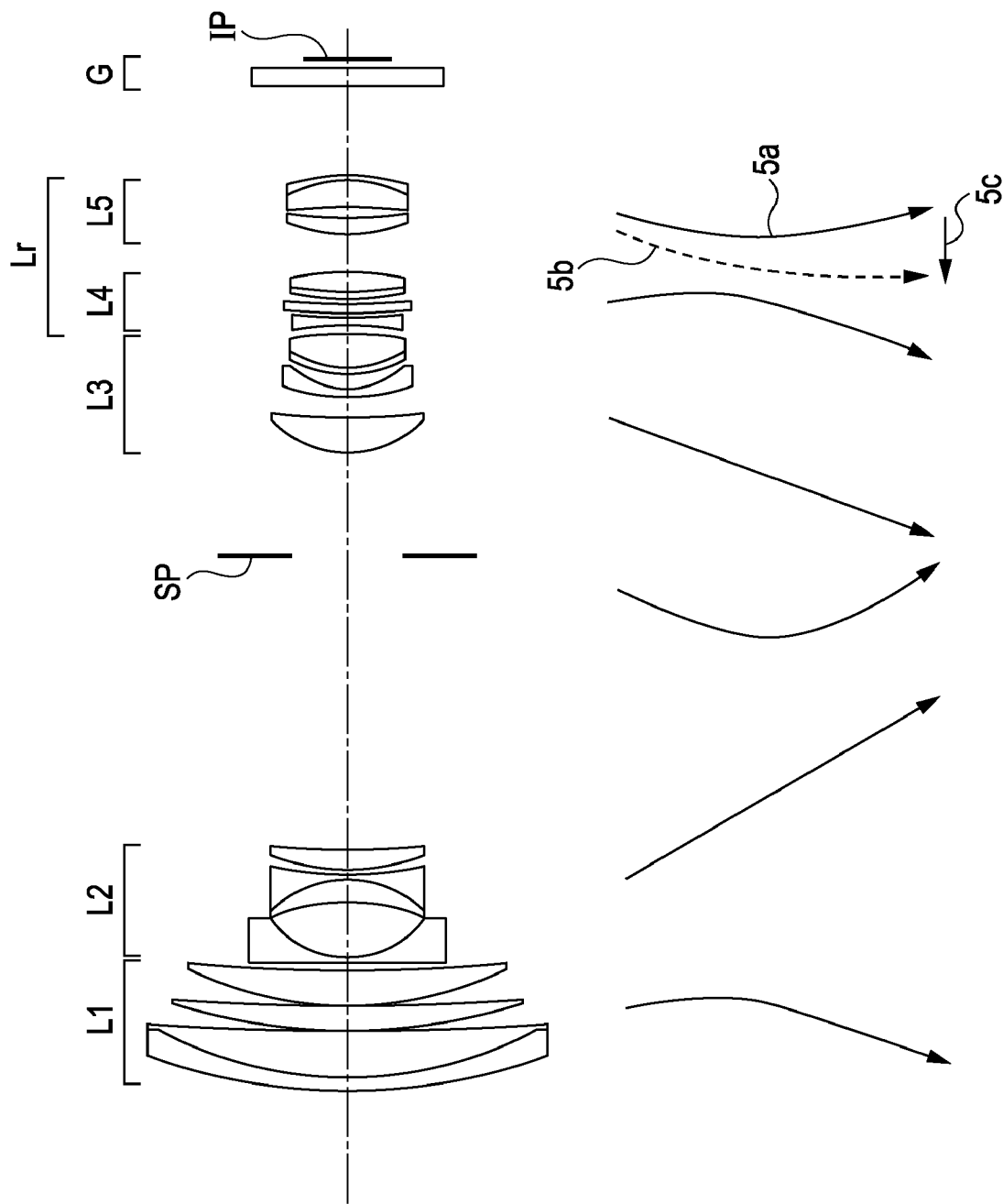

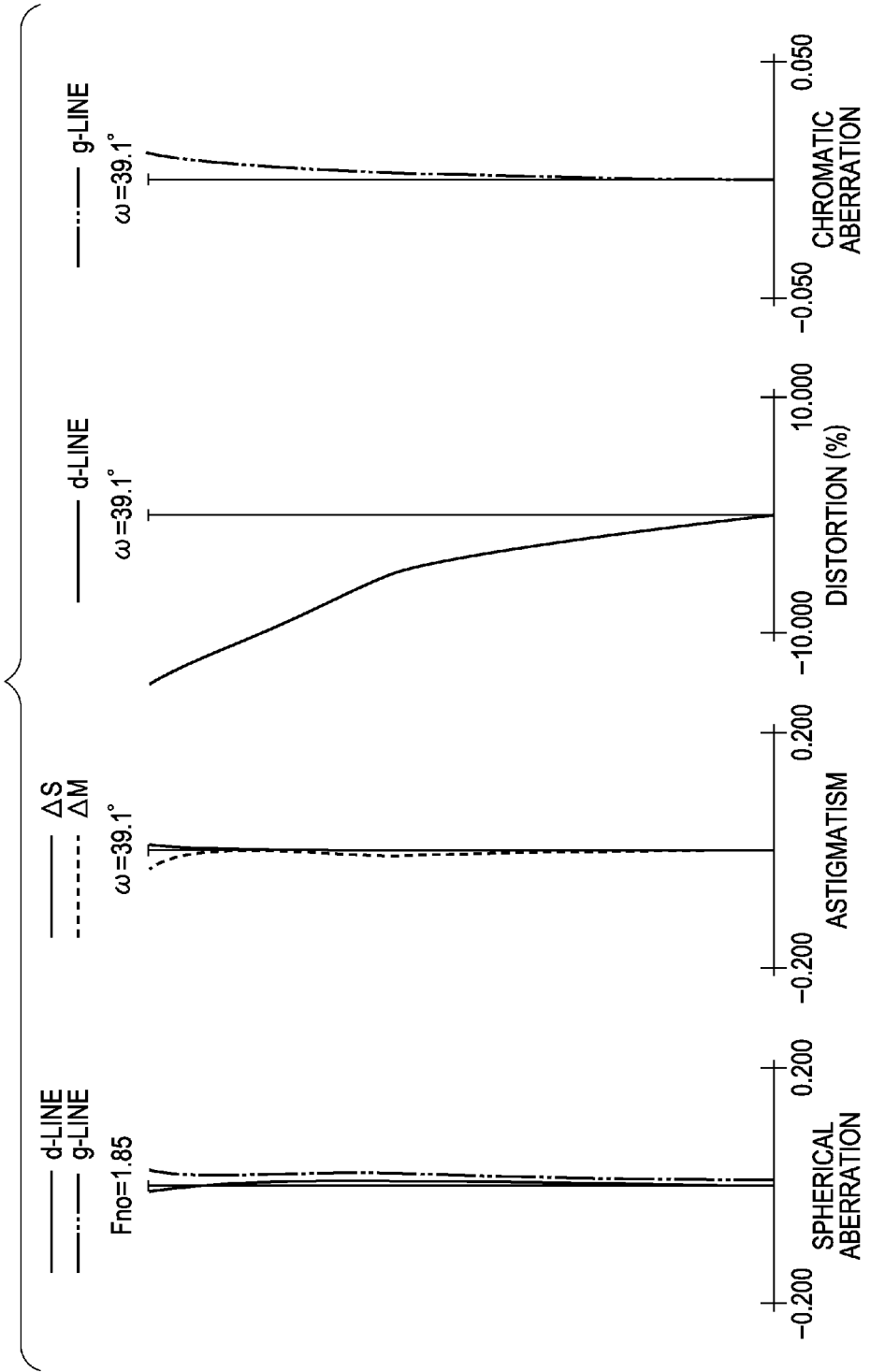

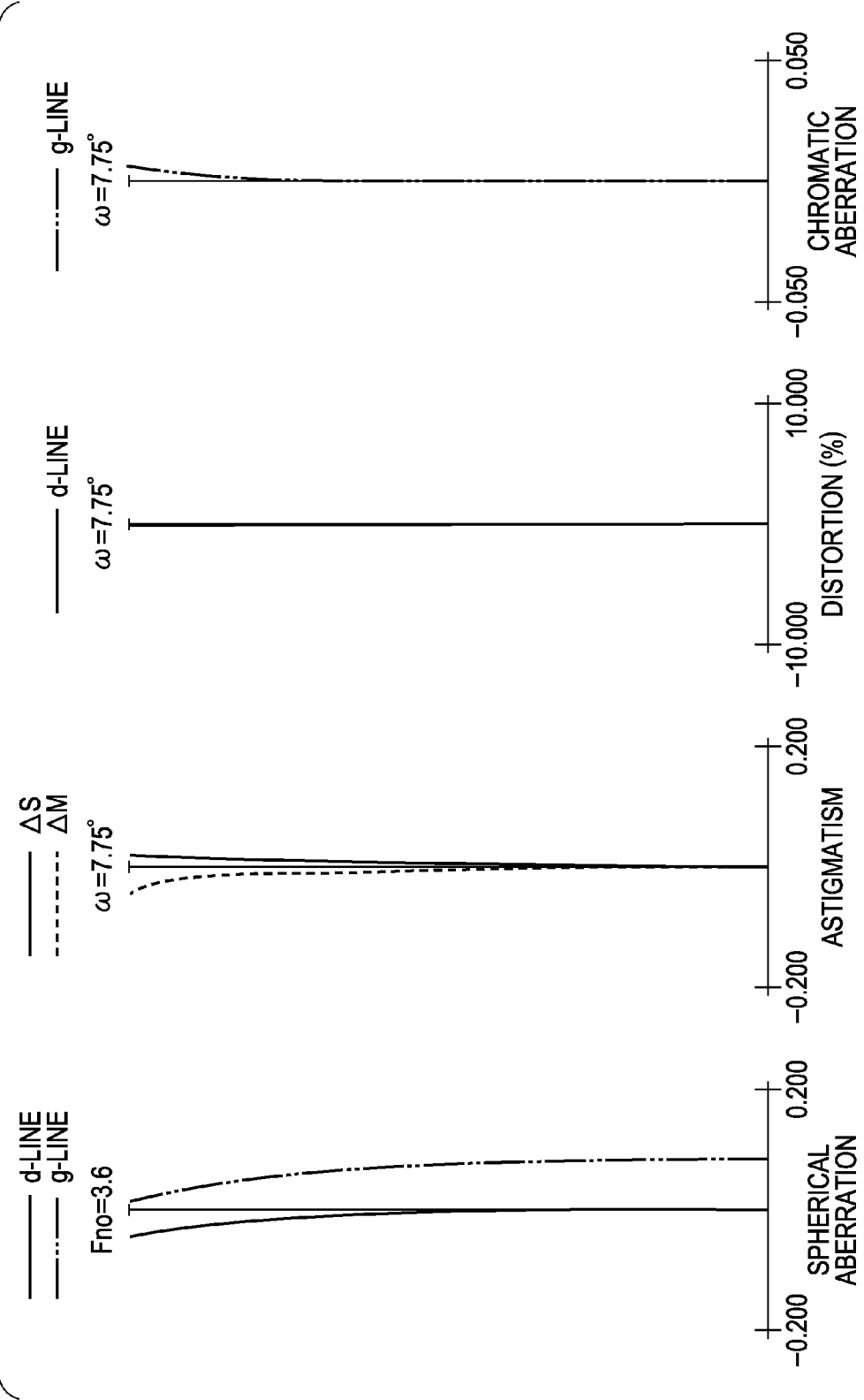

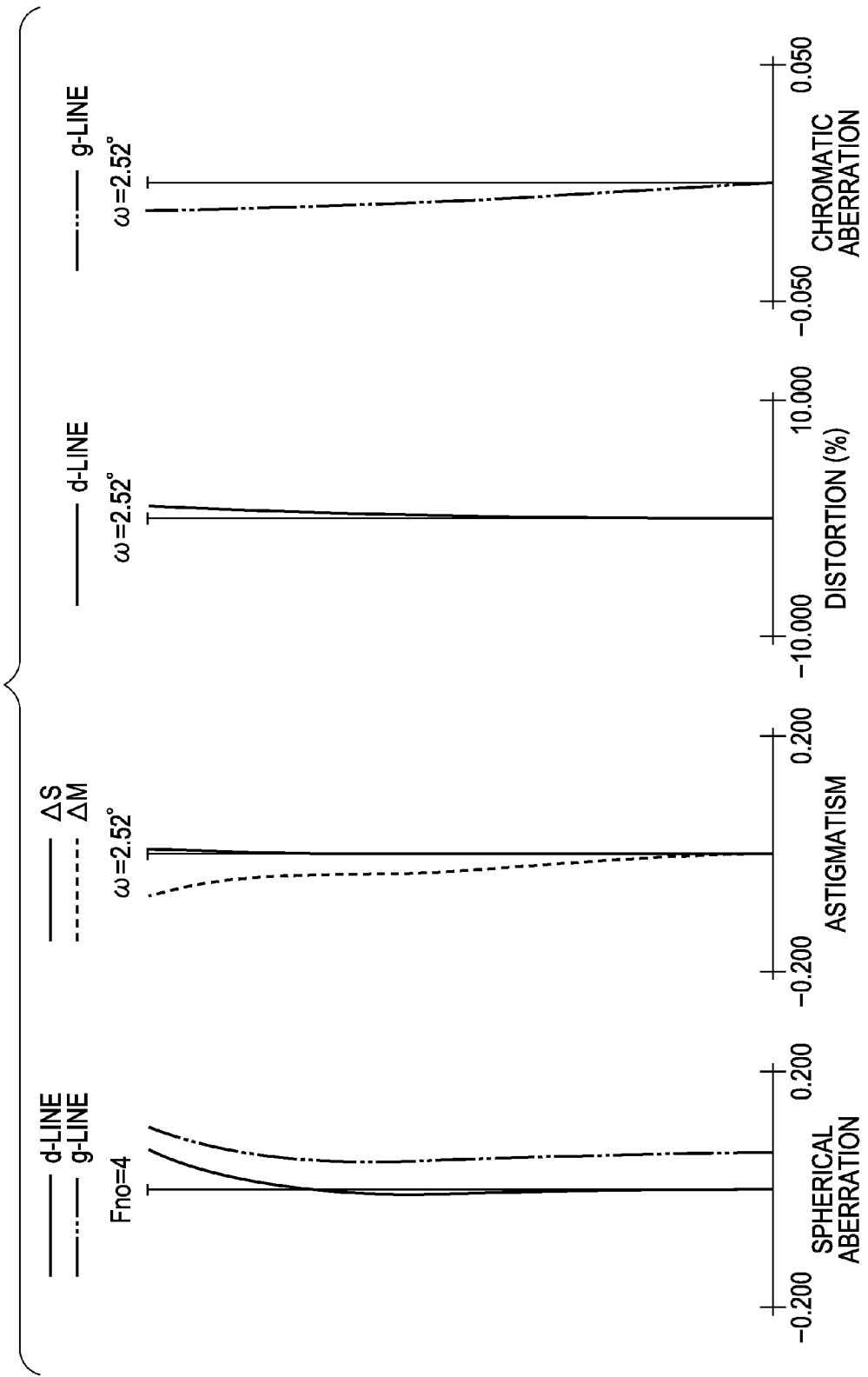

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, and more particularly, to a zoom lens suitable for use in an image pickup apparatus, such as a video camera, an electronic still camera, a broadcast camera, or a surveillance camera, or an image pickup apparatus such as a camera using a silver-halide film.

2. Description of the Related Art

In recent years, image pickup apparatuses with increased functionality and reduced size are ever more appealing. As an imaging optical system for use in such an image pickup apparatus, there is a demand for a zoom lens having compact size, wide angle of view, high zoom ratio, and high resolving power.

To achieve the desired high zoom ratio and compact size of a zoom lens, the refractive powers (optical powers=reciprocals of focal lengths) of lens units that constitute the zoom lens are generally increased. In such a zoom lens, however, aberration variation due to zooming increases, the front-lens effective diameter increases in a zoom range from a wide angle end to an intermediate zoom position, and this increases the size of the entire zoom lens.

A positive lead type zoom lens is known in which a first lens unit having a positive refractive power, a second lens unit having a negative refractive power, a third lens unit having a positive refractive power, and a rear group including at least one lens unit are arranged in order from an object side to an image side. The side of a lens where an object to be imaged is placed is referred to as the object side or front side of the lens; and the side of the lens where the image is formed is referred to as the image side or back side of the lens.

U.S. Pat. No. 7,206,137 discloses a zoom lens that includes, in order from the object side to the image side, four lens units respectively having positive, negative, positive, and positive refractive powers.

U.S. Pat. No. 7,286,304 discloses a zoom lens that includes, in order from the object side to the image side, five lens units respectively having positive, negative, positive, positive, and positive refractive powers.

U.S. Patent Application Publication No. 2008/0231969 A1 discloses a zoom lens that includes, in order from the object side to the image side, five lens units respectively having positive, negative, positive, negative, and positive refractive powers.

To obtain a high optical performance in these zoom lenses while ensuring a wide angle of view, a high zoom ratio, and a compact size, it is important to properly set the refractive powers, lens configurations, and moving parameters of each the lens units or components thereof during a zooming operation. In particular, it is important to properly set the refractive powers of the first and second lens units, the lens configuration of the second lens unit, and the moving conditions of the first, second, and third lens units for zooming. It is also important to properly set the position of an aperture stop and the moving condition of the aperture stop during zooming.

SUMMARY OF THE INVENTION

A zoom lens according to an aspect of the present invention includes a first lens unit having a positive refractive power; a second lens unit having a negative refractive power; an aperture stop; a third lens unit having a positive refractive power; and a rear group including at least one lens unit. The first lens unit, the second lens unit, the aperture stop, the third lens unit, and the rear group are arranged in order from an object side to an image side. During zooming from a wide angle end to a telephoto end, the first lens unit moves to the object side, the second lens unit moves to the image side, the aperture stop moves to the object side along a convex path, and the third lens unit moves to the object side. The following conditions are satisfied:

$$0.80 < |(R21b + R21a)/(R21b - R21a)| < 1.30$$

$$7.00 < f1/fw < 40.00$$

$$0.05 < |f2/ft| < 0.10$$

where $R21a$ and $R21b$ represent radii of curvature of an object-side lens surface and an image-side surface of a lens closest to the object side in the second lens unit, $fw$ and $ft$ represent focal lengths of the entire zoom lens at the wide angle end and the telephoto end, and $f1$ and $f2$ represent focal lengths of the first lens unit and the second lens unit.

According to the present invention, it is possible to obtain a zoom lens having a compact lens system, a wide angle of view, a high zoom ratio, and a high optical performance over the entire zoom range.

Further features of the present invention will become apparent to persons of ordinary skill in the art from the following description of exemplary embodiments with reference to the attached drawings.

BRIEF DESCRIPTION OF THE DRAWINGS

FIG. 1 is a lens cross-sectional view of a zoom lens according to a first embodiment of the present invention at a wide angle end.

FIGS. 2A, 2B, and 2C are aberration diagrams of the zoom lens of the first embodiment, respectively, at the wide angle end, an intermediate zoom position, and a telephoto end.

FIG. 3 is a lens cross-sectional view of a zoom lens according to a second embodiment of the present invention at a wide angle end.

FIGS. 4A, 4B, and 4C are aberration diagrams of the zoom lens of the second embodiment, respectively, at the wide angle end, an intermediate zoom position, and a telephoto end.

FIG. 5 is a lens cross-sectional view of a zoom lens according to a third embodiment of the present invention at a wide angle end.

FIGS. 6A, 6B, and 6C are aberration diagrams of the zoom lens of the third embodiment, respectively, at the wide angle end, an intermediate zoom position, and a telephoto end.

FIG. 7 is a lens cross-sectional view of a zoom lens according to a fourth embodiment of the present invention at a wide angle end.

FIGS. 8A, 8B, and 8C are aberration diagrams of the zoom lens of the fourth embodiment, respectively, at the wide angle end, an intermediate zoom position, and a telephoto end.

FIG. 9 is a lens cross-sectional view of a zoom lens according to a fifth embodiment of the present invention at a wide angle end.

FIGS. 10A, 10B, and 10C are aberration diagrams of the zoom lens of the fifth embodiment, respectively, at the wide angle end, an intermediate zoom position, and a telephoto end.

DESCRIPTION OF THE EMBODIMENTS

A zoom lens of the present invention includes, in order from an object side to an image side, a first lens unit having a positive refractive power, a second lens unit having a negative refractive power, an aperture stop, a third lens unit having a positive refractive power, and a rear group including at least one lens unit. For zooming relative to an imaging surface from a wide angle to a telephoto end, the first lens unit moves to the object side, the second lens unit moves to the image side, and the third lens unit moves to the object side. The aperture stop moves to the object side along a convex path.

Figure 2B:
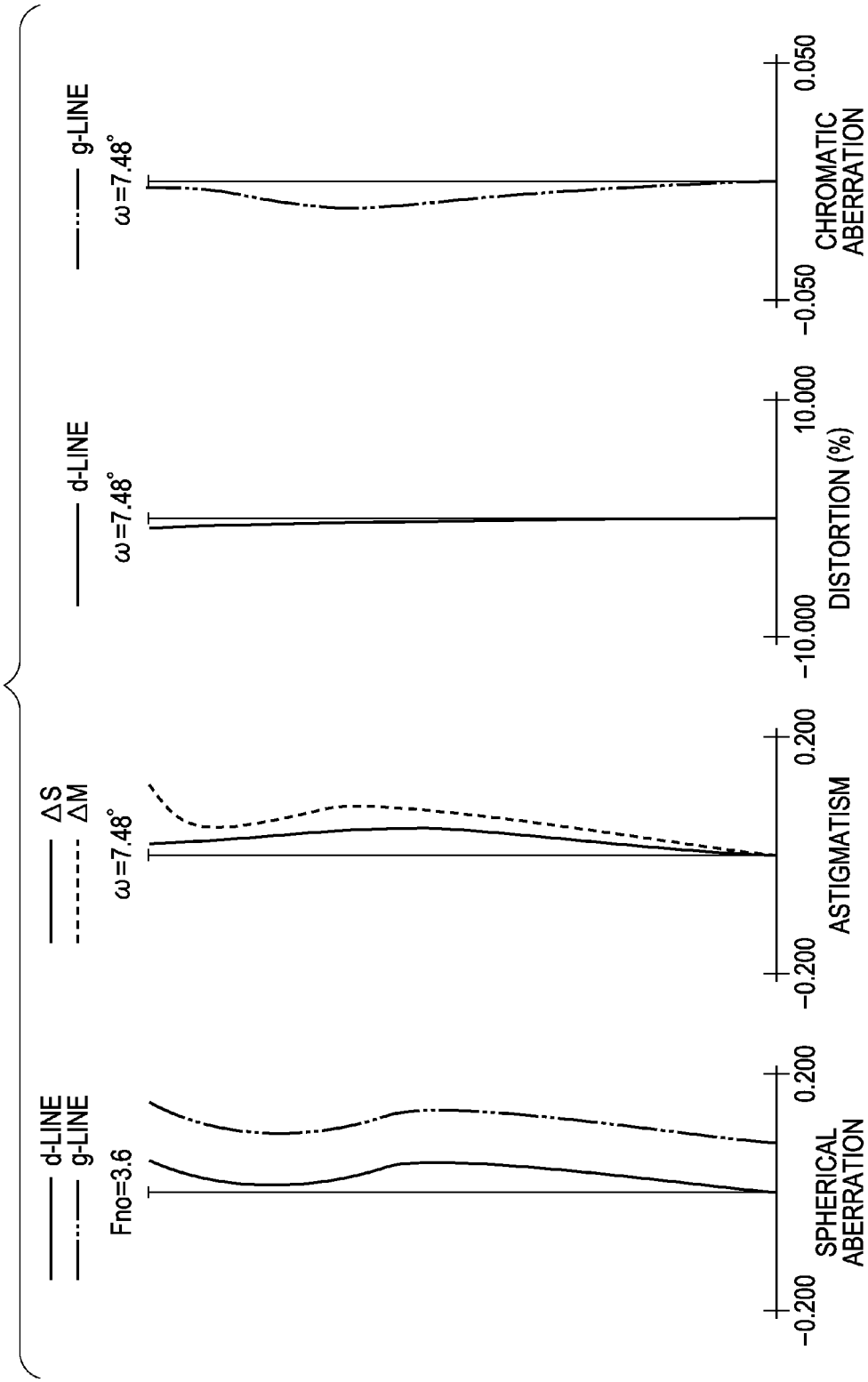
Figure 8C:
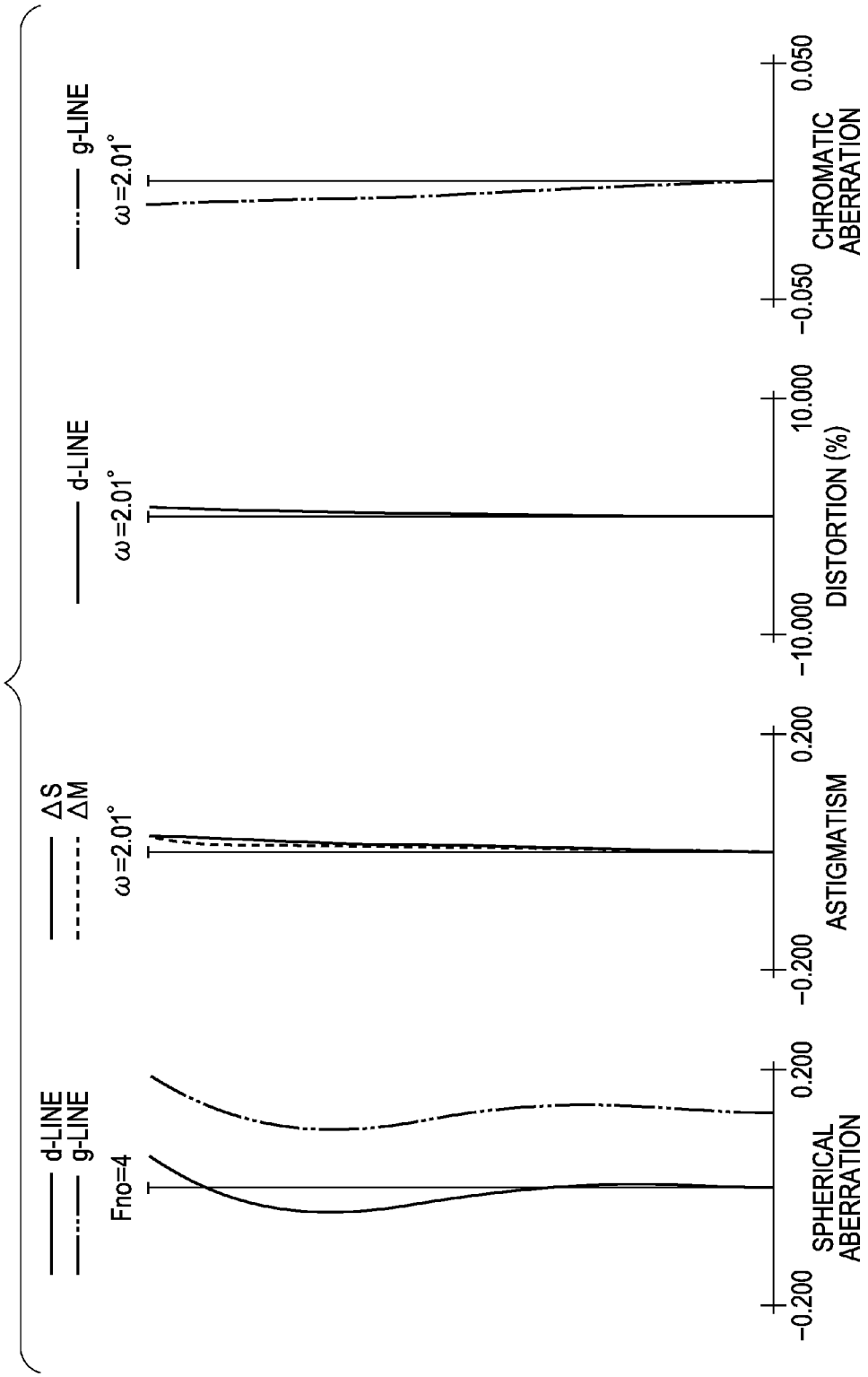

FIG. 1 is a lens cross-sectional view of a zoom lens according to a first embodiment of the present invention at a wide angle end (short focal-length end). FIGS. 2A, 2B, and 2C are aberration diagrams of the zoom lens of the first embodiment, respectively, at the wide angle end, an intermediate zoom position, and a telephoto end (long focal-length end). FIG. 3 is a lens cross-sectional view of a zoom lens according to a second embodiment of the present invention at a wide angle end. FIGS. 4A, 4B, and 4C are aberration diagrams of the zoom lens of the second embodiment, respectively, at the wide angle end, an intermediate zoom position, and a telephoto end. FIG. 5 is a lens cross-sectional view of a zoom lens according to a third embodiment of the present invention at a wide angle end. FIGS. 6A, 6B, and 6C are aberration diagrams of the zoom lens of the third embodiment, respectively, at the wide angle end, an intermediate zoom position, and a telephoto end. FIG. 7 is a lens cross-sectional view of a zoom lens according to a fourth embodiment of the present invention at a wide angle end. FIGS. 8A, 8B, and 8C are aberration diagrams of the zoom lens of the fourth embodiment, respectively, at the wide angle end, an intermediate zoom position, and a telephoto end.

Figure 11:
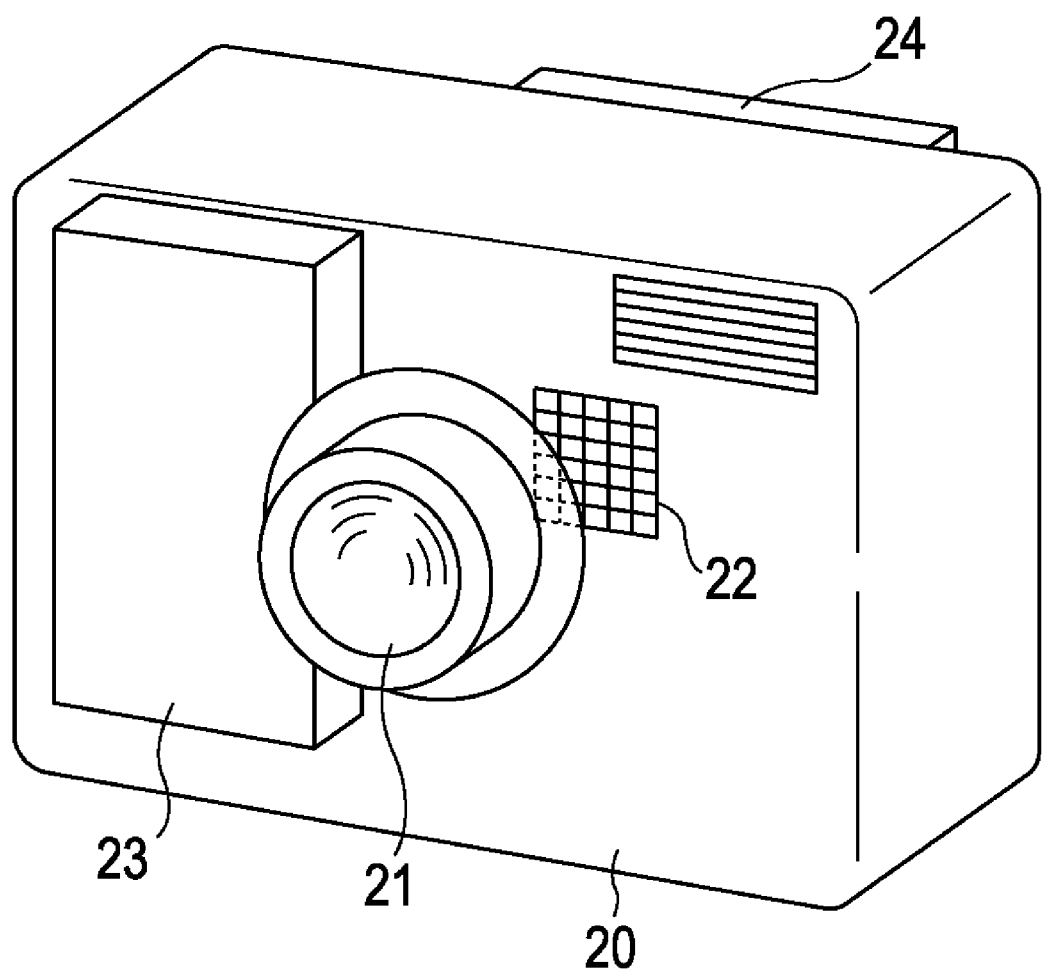
FIG. 11 is a schematic view illustrating an exemplary image pickup apparatus according to an embodiment of the present invention.

FIG. 9 is a lens cross-sectional view of a zoom lens according to a fifth embodiment of the present invention at a wide angle end. FIGS. 10A, 10B, and 10C are aberration diagrams of the zoom lens of the fifth embodiment, respectively, at the wide angle end, an intermediate zoom position, and a telephoto end. FIG. 11 is a schematic view illustrating pertinent parts of a camera (image pickup apparatus) including the zoom lens of the present invention.

The zoom lenses of the embodiments are imaging lens systems for use in image pickup apparatuses such as a video camera, a digital camera, and a silver-halide film camera. In the lens cross-sectional views, the left side is an object side (front side), the right side is an image side (rear side), i represents the order number of the lens unit from the object side, Li represents the i-th lens unit, and Lr represents a rear group including at least one lens unit.

Referring to the lens cross-sectional view of the first embodiment shown in FIG. 1, the zoom lens includes a first lens unit L1 having a positive refractive power, a second lens unit L2 having a negative refractive power, a third lens unit L3 having a positive refractive power, and a rear group Lr formed by a fourth lens unit L4 having a positive refractive power. The zoom lens of the first embodiment is a positive lead type four-unit zoom lens. Referring to the lens cross-sectional views of the second to fourth embodiments shown in FIGS. 3, 5, and 7, the zoom lens includes a first lens unit L1 having a positive refractive power, a second lens unit L2 having a negative refractive power, a third lens unit L3 having a positive refractive power, and a rear group Lr. The rear group Lr is formed by a fourth lens unit L4 having a negative refractive power and a fifth lens unit L5 having a positive refractive power. The zoom lenses of the second to fourth embodiments are positive lead type five-unit zoom lenses. Referring to the lens cross-sectional view of the fifth embodiment shown in FIG. 9, the zoom lens includes a first lens unit L1 having a positive refractive power, a second lens unit L2 having a negative refractive power, a third lens unit L3 having a positive refractive power, and a rear group Lr. The rear group Lr is formed by a fourth lens unit L4 having a positive refractive power and a fifth lens unit L5 having a positive refractive power. The zoom lens of the fifth embodiment is a positive lead type five-unit zoom lens.

In the embodiments, an aperture stop SP is provided on an object side of the third lens unit L3. An optical block G corresponds to an optical filter, a face plate, a crystal low-pass filter, or an infrared cut-off filter. An image plane IP corresponds to an image pickup surface of a solid-state image pickup element (photoelectric conversion element), such as a CCD sensor or a CMOS, when the zoom lens is used as an imaging optical system for a video camera or a digital still camera, and to a film surface when the zoom lens is used in a silver-halide film camera. In the aberration diagrams, d and g respectively represent a d-line and a g-line, and ΔM and ΔS respectively represent a meridional image plane and a sagittal image plane. Lateral chromatic aberration is represented by the g-line, ω represents the half angle of view (half of the imaging angle of view), and Fno represents the f-number. In the following embodiments, the wide angle end and the telephoto end refer to zoom positions provided when the lens unit for zooming is positioned at opposite ends of a mechanical movable range on the optical axis. Arrows show moving paths for zooming from the wide angle end to the telephoto end or focusing.

In the first embodiment shown in FIG. 1, during zooming from the wide angle end to the telephoto end, the first lens unit L1 moves to the image side along a convex path, the second lens unit L2 moves to the image side, the third lens unit L3 moves to the object side, and the fourth lens unit L4 moves to the object side along a convex path. The aperture stop SP moves to the object side along a convex path independently of the other lens units. Further, a rear focus method in which focusing is performed by moving the fourth lens unit L4 along the optical axis is adopted. Focusing from an object at infinity to a near object at the telephoto end is performed by moving the fourth lens unit L4 forward, as shown by arrow 4c in the lens cross-sectional view. A solid curve 4a and a dotted curve 4b relating to the fourth lens unit L4 indicate moving paths along which the fourth lens unit L4 moves to correct image plane variation due to zooming from the wide angle end to the telephoto end while the focus is on the object at infinity and the near object.

In the second to fifth embodiments shown in FIGS. 3, 5, 7, and 9, during zooming from the wide angle end to the telephoto end, the first lens unit L1 moves to the image side along a convex path, the second lens unit L2 moves to the image side, the third lens unit L3 moves to the object side, the fourth lens unit L4 moves to the image side along a convex path, and the fifth lens unit L5 moves to the object side along a convex path. The aperture stop SP moves to the object side along a convex path independently of the other lens units. Further, a rear focus method in which focusing is performed by moving the fifth lens unit L5 along the optical axis is adopted. Focusing from an object at infinity to a near object at the telephoto end is performed by moving the fifth lens unit L5 forward, as shown by arrow 5c in the lens cross-sectional view. A solid curve 5a and a dotted curve 5b relating to the fifth lens unit L5 indicate moving paths along which the fifth lens unit L5 moves to correct image plane variation due to zooming from the wide angle end to the telephoto end while the focus is on the object at infinity and the near object. In the embodiments, the number of lens units that constitute the rear group Lr can be arbitrarily determined, and it is only necessary that the rear group Lr should include at least one lens unit.

During zooming from the wide angle end to the telephoto end, the first lens unit L1 having a positive refractive power moves to the object side relative to the image plane. This gives a large share of zooming effect to the second lens unit L2 having a negative refractive power, so that the size of the entire lens system is reduced while ensuring a high zoom ratio. Further, the aperture stop SP moves to the object side along a convex path so as to be located closest to the object side in the intermediate zoom range. This prevents the front-lens effective diameter from increasing. The third lens unit L3 moves to the object side relative to the image plane so as to also share the zooming function for higher zoom ratio. The embodiments adopt a rear focus method in which focusing is performed by moving the fourth lens unit L4 or the fifth lens unit L5 along the optical axis. Moreover, quick focusing is easily performed by moving the lightweight fourth or fifth lens unit L4 or L5 for focusing.

In the embodiments, the following conditions are satisfied:

$$0.80 < |(R21b+R21a)/(R21b-R21a)| < 1.30 \quad (1)$$

$$7.00 < f1/fw < 40.00 \quad (2)$$

$$0.05 < |f2/ft| < 0.10 \quad (3)$$

where R21$a$ and R21$b$ represent radii of curvature of an object-side lens surface and an image-side lens surface of a lens closest to the object side in the second lens unit L2, fw and ft represent focal lengths of the entire zoom lens at the wide angle end and the telephoto end, and f1 and f2 represent focal lengths of the first lens unit L1 and the second lens unit L2.

Conditional Expression (1) specifies the lens shape of a negative lens closest to the object side in the second lens unit L2. Conditional Expression (2) specifies the focal length of the first lens unit L1. Conditional Expression (3) specifies the focal length of the second lens unit L2. Conditional Expression (1) specifies that an object-side lens surface of the negative lens closest to the object side in the second lens unit L2 has a small radius of curvature and that an image-side lens surface of the negative lens is a concave surface having a large refractive power. This allows the principal point of the second lens unit L2 to be easily placed on the object side, and easily reduces the front-lens effective diameter. Moreover, curvature of field and coma aberration at the lens surfaces are reduced and corrected easily. When the value exceeds the upper limit in Conditional Expression (1), the principal point of the second lens unit L2 is likely to be placed on the image side, and this increases the front-lens effective diameter. In contrast, when the value falls below the lower limit, curvature of field and coma aberration at the lens surfaces increase, and are therefore difficult to correct.

By setting the focal length of the first lens unit L1 so as to satisfy Conditional Expression (2), the size of the entire lens system is easily reduced while correcting variation in curvature of field due to zooming. When the value exceeds the upper limit in Conditional Expression (2), the focal length of the first lens unit L1 is too long, the front-lens effective diameter increases, and the size of the entire lens system increases. In contrast, when the value falls below the lower limit, the focal length of the first lens unit L1 is too short, and it is therefore difficult to correct curvature of field over the entire zoom range. By setting the focal length of the second lens unit L2 so as to satisfy Conditional Expression (3), the size of the entire lens system is easily reduced while properly correcting coma aberration over the entire zoom range. When the value exceeds the upper limit in Conditional Expression (3), the focal length of the second lens unit L2 is too long, the moving amount of the second lens unit L2 for zooming increases, and the size of the entire lens system increases. In contrast, when the value falls below the lower limit, the focal length of the second lens unit L2 is too short, and it is therefore difficult to correct coma aberration over the entire zoom range.

In the embodiments, a zoom lens having a wide angle of view, a high zoom ratio, and a high optical performance over the entire zoom range is obtained by satisfying all of Conditional Expressions (1), (2), and (3). Further, the increase in front-lens effective diameter is effectively suppressed over the entire zoom range by moving the aperture stop SP, as described above.

In the embodiments, it is preferable to set the numerical ranges in Conditional Expressions (1) to (3) as follows:

$$0.80 < |(R21b+R21a)/(R21b-R21a)| < 1.20 \quad (1a)$$

$$7.00 < f1/fw < 15.00 \quad (2a)$$

$$0.07 < |f2/ft| < 0.10 \quad (3a).$$

It is more preferable to set the numerical ranges in Conditional Expressions (1) and (2) as follows:

$$0.90 < |(R21b+R21a)/(R21b-R21a)| < 1.10 \quad (1b)$$

$$8.00 < f1/fw < 11.00 \quad (2b).$$

In the embodiments, a zoom lens having a wide angle of view, a high zoom ratio, and a high optical performance over the entire zoom range can be obtained by adopting the above-described structures.

It is more preferable to satisfy at least one of the following conditions:

$$2.00 < f3/fw < 6.00 \quad (4)$$

$$70 < v1p \quad (5)$$

where f3 represents a focal length of the third lens unit L3, the first lens unit L1 includes, in order from the object side to the image side, a positive meniscus lens having a concave surface on the image side and three positive lenses each having a convex surface on the object side, and v1$p$ represents the average Abbe number of materials of the three positive lenses.

Conditional Expression (4) specifies the refractive power of the third lens unit L3. When the value exceeds the upper limit in Conditional Expression (4), the refractive power of the third lens unit L3 is too small, and the moving amount of the third lens unit L3 for zooming is large. As a result, the distance between the second lens unit L2 and the third lens unit L3 at the wide angle end increases, and therefore, the front-lens effective diameter increases. In contrast, when the value falls below the lower limit, the refractive power of the third lens unit L3 is too large, and it is therefore difficult to correct aberrations, especially, spherical aberration. Conditional Expression (5) specifies the average Abbe number of the materials of the three positive lenses in the first lens unit L1. When the value falls below the lower limit in Conditional Expression (5) and the average Abbe number is small, dispersion is too large, and it is therefore difficult to correct chromatic aberration at the first lens unit L1. Accordingly, by adopting the above-described lens configuration of the first lens unit L1, chromatic aberration is effectively corrected at the telephoto end while realizing size reduction of the entire lens system. In the embodiments, it is more preferable to set the numerical ranges in Conditional Expressions (4) and (5) as follows:

$$3.00 < f3/fw < 4.00 \quad (4a)$$

$$80 < v1p \quad (5a)$$

In the second to fourth embodiments, the rear group Lr includes, in order from the object side to the image side, a fourth lens unit L4 having a negative refractive power and a fifth lent unit L5 having a positive refractive power.

In the fifth embodiment, the rear group Lr includes, in order from the object side to the image side, a fourth lens unit L4 having a positive refractive power and a fifth lens unit L5 having a positive refractive power. In these embodiments, at least one of the following conditions are satisfied:

$$0.50 < |f4/ft| < 2.00 \quad (6)$$

$$0.10 < f5/ft < 0.70 \quad (7)$$

where f4 and f5 represent focal lengths of the fourth lens unit L4 and the fifth lens unit L5.

Conditional Expression (6) properly specifies the refractive power of the fourth lens unit L4. When the value exceeds the upper limit in Conditional Expression (6), a light beam exiting from the fourth lens unit L4 is likely to become convergent light. In this case, the focus sensitivity of the fifth lens unit L5 decreases, the moving amount for focusing increases, and the total lens length increases. In contrast, when the value falls below the lower limit, the refractive power of the fourth lens unit L4 is too large, and curvature of field becomes too large to correct. Conditional Expression (7) specifies the refractive power of the fifth lens unit L5. When the value exceeds the upper limit in Conditional Expression (7), the focus sensitivity of the fifth lens unit L5 decreases, the moving amount for focusing increases, and the total lens length increases. In contrast, when the value falls below the lower limit, the refractive power of the fifth lens unit L5 is too large, and curvature of field becomes too large to correct. In the embodiments, it is preferable to set the numerical ranges in Conditional Expressions (6) and (7) as follows:

$$0.50 < |f4/ft| < 1.70 \quad (6a)$$

$$0.20 < f5/ft < 0.50 \quad (7a).$$

It is more preferable to set the numerical ranges in Conditional Expressions (6a) and (7a) as follows:

$$0.50 < |f4/ft| < 1.00 \quad (6b)$$

$$0.20 < f5/ft < 0.40 \quad (7b)$$

As described above, according to the embodiments, it is possible to obtain a zoom lens having a wide imaging angle of view 2ω of 70° or more, a high zoom ratio of 15 or more, a small front-lens effective diameter, and a high optical performance. In an image pickup apparatus including a photoelectric conversion element for receiving an image formed by the zoom lens of any of the embodiments, the following condition is satisfied:

$$\tan \omega w > 0.70 \quad (8)$$

where ωw represents the maximum half angle of view of the zoom lens.

Conditional Expression (8) properly specifies the imaging angle of view determined by the focal length of the zoom lens and the effective diameter of an image pickup element provided in an image pickup apparatus (optical apparatus) to which the zoom lens of any of the embodiments is applied. This allows the zoom lens of the embodiment to be used particularly effectively. When the value falls below the lower limit in Conditional Expression (8), the angle of view of the image pickup apparatus is insufficiently increased. In the embodiments, it is more preferable to set Conditional Expression (8) as follows:

$$\tan \omega w > 0.80 \quad (8a)$$

In the second to fifth embodiments, the second lens unit L2 includes, in order from the object side to the image side, a negative lens whose absolute value of the radius of curvature is smaller at the image side than at the object side and which has a concave surface on the image side, a positive meniscus lens having a concave surface on the object side, a biconcave negative lens, and a positive lens. At least one of the lens surfaces in the second lens unit L2 is aspherical. With this lens configuration of the second lens unit L2, curvature of field is effectively corrected while realizing size reduction of the entire lens system. The third lens unit L3 includes, in order from the object side to the image side, a positive lens having a convex surface on the object side, a negative meniscus lens having a convex surface on the object side, and a cemented lens formed by cementing a negative lens and a positive lens. With this lens configuration of the third lens unit L3, aberration variation due to zooming is properly corrected, and a high optical performance is obtained over the entire zoom range. Lens configurations of the lens units that in the embodiments will be described below. The lenses are arranged in order from the object side to the image side.

FIRST EMBODIMENT

The first lens unit 11 includes a cemented lens formed by cementing a negative meniscus lens having a concave surface on the image side and a positive meniscus lens having a convex surface on the object side, a positive meniscus lens having a convex surface on the object side, and a positive meniscus lens having a convex surface on the object side. With this lens configuration, chromatic aberration at the telephoto end is effectively corrected while realizing size reduction of the entire lens system. The second lens unit L2 includes an aspherical negative lens having a concave surface on the image side, a negative lens having a concave surface on the object side, a biconvex positive lens, and a negative lens having a concave surface on the object side. During zooming, the aperture stop SP moves independently of the lens units. The third lens unit L3 includes an aspherical positive lens having a convex surface on the object side, a negative lens having a concave surface on the image side, and a cemented lens of a negative lens and a positive lens. The fourth lens unit L4 is formed by a cemented lens of an aspherical positive lens having a convex surface on the object side and a negative lens.

SECOND EMBODIMENT

The first lens unit L1 is the same as that adopted in the first embodiment. The second lens unit L2 includes an aspherical negative lens having a concave surface on the image side, a cemented lens of a positive lens having a concave surface on the object side and a biconcave negative lens, and a positive lens. During zooming, the aperture stop SP moves independently of the lens units. The third lens unit L3 is the same as that adopted in the first embodiment. The fourth lens unit L4 includes a biconcave negative lens, a positive lens, and a cemented lens of a positive lens and a negative lens. The fifth lens unit L5 includes an aspherical positive lens having a convex surface on the object side, and a cemented lens of a positive lens and a negative lens.

THIRD EMBODIMENT

The first, second, and third lens units L1, L2, and L3 are the same as those adopted in the second embodiment. The fourth lens unit L4 is formed by a negative meniscus lens having a concave surface on the image side. The fifth lens unit L5 is formed by a cemented lens of a positive lens and a negative lens.

FOURTH EMBODIMENT

The lens configurations of the lens units are the same as those adopted in the second embodiment.

FIFTH EMBODIMENT

The first, second, and third lens units L1, L2, and L3 are the same as those adopted in the second embodiment. The fourth lens unit L4 includes a biconcave negative lens, a negative lens, and a cemented lens of a negative lens and a positive lens. The fifth lens unit L5 is the same as that adopted in the second embodiment.

While the preferred embodiments of the present invention have been described above, the present invention is not limited to these embodiments, and various modifications and alterations are possible within the scope of the invention.

Concrete numerical data on first to fifth numerical examples corresponding to the first to fifth embodiments will be given below. In the numerical examples, i represents the order number of the lens surface counted from the object side, ri represents the radius of curvature of the i-th optical surface (i-th surface), di represents the axial distance between the i-th surface and the i+1-th surface, and ndi and vdi respectively represent the refractive index and the Abbe number of the material of the i-th optical member for the d-line. Further, f represents the focal length, Fno represent the f-number, and ω represents the half angle of view. When a surface of a given lens element in a lens unit is aspherical, the surface is marked with "*", and the aspherical shape is given by the following expression:

$$X = (H^2/R)/[1 + \{1-(1+K)(H/R)^2\}^{1/2}] + A3 \cdot H^3 + A4 \cdot H^4 + A5 \cdot H^5 + A6 \cdot H^6 + A7 \cdot H^7 + A8 \cdot H^8 + A9 \cdot H^9 + A10 \cdot H^{10} + A11 \cdot H^{11} + A12 \cdot H^{12}$$

where R represents the radius of curvature, and K, A3, A4, A5, A6, A7, A8, A9, A10, A11, and A12 are aspherical coefficients.

In the aspherical coefficients, "e±XX" means "×10$^{\pm xx}$". A distance d of 0 means that two lens surfaces between which the distance is provided are joined. In the numerical examples, the last two surfaces are surfaces of an optical block such as a filter or a face plate. A back focus BF represents the air conversion distance from the final lens surface to the paraxial image plane. The total lens length is the sum of the distance from the lens surface closest to the object side to the final lens surface, and the back focus. The relationships between the numerical examples and the above-described conditional expressions are shown in Table 1.

FIRST NUMERICAL EXAMPLE

Unit: mm

Surface Data

| Surface No. | r | d | nd | vd | Effective Diameter |
|---|---|---|---|---|---|
| 1 | 61.784 | 1.70 | 2.00330 | 28.3 | 46.66 |
| 2 | 41.204 | 5.11 | 1.49700 | 81.5 | 43.95 |
| 3 | 96.040 | 0.10 | | | 43.38 |
| 4 | 69.730 | 3.15 | 1.43387 | 95.1 | 42.76 |
| 5 | 189.387 | 0.10 | | | 42.40 |
| 6 | 51.650 | 4.43 | 1.72916 | 54.7 | 41.19 |
| 7 | 249.664 | (variable) | | | 40.62 |
| 8 | −292.672 | 1.00 | 1.88300 | 40.8 | 24.02 |
| 9* | 11.360 | 6.50 | | | 18.39 |
| 10* | −27.295 | 0.80 | 1.83400 | 37.2 | 18.22 |
| 11 | 700.903 | 0.11 | | | 18.66 |
| 12 | 36.650 | 2.72 | 1.94595 | 18.0 | 19.11 |
| 13 | −111.573 | 0.70 | | | 19.01 |
| 14 | −48.737 | 0.80 | 1.88300 | 40.8 | 19.00 |
| 15 | −54.372 | (variable) | | | 19.00 |
| 16 (stop) | ∞ | (variable) | | | 14.30 |
| 17* | 13.226 | 4.00 | 1.74100 | 52.6 | 17.54 |
| 18 | 124.987 | 0.86 | | | 16.94 |
| 19* | 20.603 | 0.86 | 1.75520 | 27.5 | 15.41 |
| 20 | 12.387 | 3.10 | | | 14.43 |
| 21 | 26.780 | 0.72 | 1.83400 | 37.2 | 14.65 |
| 22 | 10.533 | 3.70 | 1.49700 | 81.5 | 14.19 |
| 23 | −172.392 | (variable) | | | 14.32 |
| 24* | 27.026 | 3.30 | 1.69680 | 55.5 | 17.87 |
| 25 | −41.388 | 1.00 | 1.64769 | 33.8 | 17.78 |
| 26 | 227.428 | (variable) | | | 17.41 |
| 27 | ∞ | 2.46 | 1.51633 | 64.1 | 25.00 |
| 28 | ∞ | | | | 25.00 |
| Image Plane | ∞ | | | | |

Aspherical Surface Data

Ninth Surface

K = −2.02330e−001   A4 = −3.27761e−005   A6 = −1.73684e−007
A8 = −3.01749e−009   A10 = 2.93287e−010   A12 = −2.16374e−012
A3 = 2.56286e−005    A5 = 2.42283e−006    A7 = −6.28855e−008
A9 = −2.72191e−010   A11 = −1.96319e−012

Tenth Surface

K = −9.40387e−001   A4 = −4.16204e−006   A6 = −2.04117e−007
A8 = 4.30139e−009    A10 = −4.32552e−011  A12 = 1.90035e−014
A3 = −1.19001e−005   A5 = −1.42665e−006   A7 = −1.93479e−008
A9 = 8.46186e−010    A11 = −7.74305e−012

Seventeenth Surface

K = −5.30481e−001   A4 = 8.55216e−006    A6 = 8.03290e−009
A8 = 5.06159e−010    A10 = 3.98319e−012   A12 = −1.20070e−014
A3 = −1.13810e−005   A5 = 1.95274e−006    A7 = −2.65021e−008
A9 = 2.22806e−010    A11 = −2.28290e−013

Nineteenth Surface

K = −1.24137e+000   A4 = −1.79087e−005   A6 = −2.82094e−008
A8 = −2.03466e−010   A10 = −1.40180e−011  A12 = −7.89098e−014
A3 = 1.54802e−005    A5 = −2.37173e−007   A7 = −1.89851e−008
A9 = 1.78436e−010    A11 = −1.30859e−012

Twenty-Fourth Surface

K = −1.92754e+000   A4 = 5.02869e−006    A6 = −1.81098e−007
A8 = 1.65543e−009    A10 = −3.15801e−013  A12 = −2.56726e−014
A3 = 1.90489e−006    A5 = 2.39479e−006    A7 = −4.08024e−009
A9 = −1.20661e−010   A11 = 6.58939e−013

-continued

Unit: mm

Various Data
Zoom Ratio 19.35

|  | Wide Angle | Intermediate | Telephoto |
|---|---|---|---|
| f | 7.23 | 48.39 | 139.96 |
| Fno | 1.83 | 3.60 | 4.00 |
| ω | 41.10 | 7.48 | 2.60 |
| Total lens length | 121.51 | 138.36 | 142.42 |
| BF | 1.30 | 1.30 | 1.30 |
| d7 | 2.11 | 37.02 | 47.09 |
| d15 | 39.56 | 5.46 | 1.32 |
| d16 | 11.26 | 9.07 | 2.64 |
| d23 | 10.60 | 23.43 | 38.71 |
| d26 | 9.47 | 14.87 | 4.15 |
| Entrance pupil position | 28.12 | 166.79 | 330.30 |
| Exit pupil position | −206.49 | 1055.74 | 224.27 |
| Front principal point | 35.10 | 217.41 | 558.12 |
| Rear principal point | −5.94 | −47.09 | −138.66 |

Zoom Lens Unit Data

| Unit | First Surface | Focal Length | Lens Length | Front Principal Point | Rear Principal Point |
|---|---|---|---|---|---|
| 1 | 1 | 72.37 | 14.59 | 3.46 | −5.91 |
| 2 | 8 | −13.12 | 12.63 | −0.02 | −10.71 |
| Stop | 16 | ∞ | 0.00 | 0.00 | −0.00 |
| 3 | 17 | 28.62 | 13.24 | −3.01 | −11.98 |
| 4 | 24 | 41.24 | 4.30 | −0.20 | −2.74 |

Single Lens Data

| Lens | First Surface | Focal Length |
|---|---|---|
| 1 | 1 | −128.61 |
| 2 | 2 | 140.84 |
| 3 | 4 | 252.37 |
| 4 | 6 | 88.48 |
| 5 | 8 | −12.37 |
| 6 | 10 | −31.49 |
| 7 | 12 | 29.43 |
| 8 | 14 | −570.51 |
| 9 | 17 | 19.66 |
| 10 | 19 | −43.07 |
| 11 | 21 | −21.24 |
| 12 | 22 | 20.11 |
| 13 | 24 | 23.94 |
| 14 | 25 | −53.98 |
| 15 | 27 | 0.00 |

SECOND NUMERICAL EXAMPLE

Unit: mm

Surface Data

| Surface No. | r | d | nd | vd | Effective Diameter |
|---|---|---|---|---|---|
| 1 | 79.662 | 1.70 | 2.00330 | 28.3 | 50.00 |
| 2 | 55.397 | 5.80 | 1.43875 | 95.0 | 47.76 |
| 3 | 582.889 | 0.10 |  |  | 47.59 |
| 4 | 78.104 | 3.10 | 1.43875 | 95.0 | 46.86 |
| 5 | 206.725 | 0.10 |  |  | 46.57 |
| 6 | 51.396 | 4.80 | 1.59240 | 68.3 | 45.02 |
| 7 | 208.025 | (variable) |  |  | 44.54 |
| 8 | 478.061 | 0.85 | 2.00330 | 28.3 | 24.05 |
| 9* | 13.400 | 6.55 |  |  | 18.85 |
| 10 | −25.196 | 2.12 | 1.92286 | 18.9 | 18.32 |
| 11 | −15.953 | 0.65 | 1.74100 | 52.6 | 18.44 |
| 12 | 36.734 | 1.13 |  |  | 18.40 |
| 13 | 32.976 | 2.65 | 1.84666 | 23.9 | 18.92 |
| 14 | −142.740 | (variable) |  |  | 18.85 |
| 15(stop) | ∞ | (variable) |  |  | 15.41 |
| 16* | 15.380 | 4.70 | 1.83481 | 42.7 | 19.76 |
| 17 | 132.012 | 2.03 |  |  | 18.92 |
| 18* | 30.608 | 1.00 | 2.00069 | 25.5 | 16.58 |
| 19 | 12.195 | 2.09 |  |  | 14.90 |
| 20 | 16.700 | 0.80 | 1.83400 | 37.2 | 15.00 |
| 21 | 12.814 | 4.40 | 1.49700 | 81.5 | 14.49 |
| 22 | −42.932 | (variable) |  |  | 14.16 |
| 23 | −29.633 | 1.00 | 1.49700 | 81.5 | 13.64 |
| 24 | 23.636 | 0.89 |  |  | 13.21 |
| 25* | 83.545 | 1.40 | 1.94595 | 18.0 | 13.22 |
| 26 | 151.091 | 0.81 |  |  | 13.31 |
| 27 | 38.964 | 3.33 | 1.49700 | 81.5 | 14.01 |
| 28 | −19.042 | 0.00 |  |  | 14.30 |
| 29 | −19.042 | 0.60 | 1.83400 | 37.2 | 14.30 |
| 30 | −31.119 | (variable) |  |  | 14.67 |
| 31* | 31.116 | 1.70 | 1.48749 | 70.2 | 17.85 |
| 32 | 64.686 | 0.77 |  |  | 17.78 |
| 33 | 47.335 | 3.95 | 1.49700 | 81.5 | 17.80 |
| 34 | −20.349 | 0.00 |  |  | 17.68 |
| 35 | −20.349 | 0.65 | 1.83400 | 37.2 | 17.68 |
| 36 | −43.932 | (variable) |  |  | 17.83 |
| 37 | ∞ | 2.46 | 1.51633 | 64.1 | 25.00 |
| 38 | ∞ |  |  |  | 25.00 |
| Image Plane | ∞ |  |  |  |  |

Aspherical Surface Data

Ninth Surface

K = 3.78236e−001   A4 = −2.36521e−005   A6 = −6.47622e−007
A8 = 9.24057e−010   A10 = 1.17099e−010   A12 = −9.64378e−013
A3 = −4.84718e−006   A5 = 3.27503e−007   A7 = 1.00080e−007
A9 = −2.06991e−009   A11 = 1.01586e−011

Sixteenth Surface

K = −6.11323e−001   A4 = 6.67210e−006   A6 = −9.87431e−008
A8 = −7.63307e−010   A10 = 1.03375e−011   A12 = −1.74626e−014
A3 = 3.32407e−006   A5 = 2.23732e−007   A7 = 1.85740e−008
A9 = −1.24005e−010   A11 = 1.18671e−014

Eighteenth Surface

K = −9.30122e+000   A4 = 2.73588e−005   A6 = −2.40327e−007
A8 = −5.43808e−010   A10 = 1.97497e−012   A12 = 1.55877e−014
A3 = −1.91273e−006   A5 = 7.26764e−007   A7 = 1.13335e−008
A9 = 1.73854e−010   A11 = −9.77429e−013

Twenty-Fifth Surface

K = −1.26072e+000   A4 = 1.65043e−005   A6 = 8.35351e−008
A8 = 7.49988e−010   A10 = 2.90374e−010   A12 = 1.49029e−012
A3 = −8.26527e−006   A5 = −5.64440e−007   A7 = −4.42219e−009
A9 = −8.71323e−010   A11 = −3.55982e−011

Thirty-First Surface

K = 1.01663e+000   A4 = −3.59004e−006   A6 = 4.62769e−009
A8 = 1.34026e−010   A10 = 1.25828e−012   A12 = −1.60867e−013
A3 = 1.07705e−005   A5 = −2.39973e−007   A7 = 9.70039e−009
A9 = −1.80292e−010   A11 = 2.51508e−012

Various Data
Zoom Ratio 19.37

|  | Wide angle | Intermediate | Telephoto |
|---|---|---|---|
| f | 7.28 | 47.86 | 141.00 |
| Fno | 1.85 | 3.60 | 4.00 |
| ω | 42.00 | 7.58 | 2.58 |
| Total lens length | 135.28 | 150.32 | 153.05 |
| BF | 1.69 | 1.69 | 1.69 |
| d7 | 0.98 | 35.90 | 49.30 |
| d14 | 37.71 | 6.11 | 1.98 |
| d15 | 14.60 | 6.87 | 1.95 |
| d22 | 1.27 | 5.68 | 1.33 |
| d30 | 5.04 | 8.39 | 20.75 |

-continued

Unit: mm

| | | | |
|---|---|---|---|
| d36 | 11.86 | 23.55 | 13.92 |
| Entrance pupil position | 26.76 | 160.62 | 435.34 |
| Exit pupil position | 526.49 | −359.29 | −568.68 |
| Front principal point | 34.15 | 202.14 | 541.49 |
| Rear principal point | −5.59 | −46.17 | −139.31 |

Zoom Lens Unit Data

| Unit | First Surface | Focal Length | Lens Length | Front Principal Point | Rear Principal Point |
|---|---|---|---|---|---|
| 1 | 1 | 72.85 | 15.60 | 4.05 | −6.30 |
| 2 | 8 | −11.97 | 13.95 | 0.41 | −11.41 |
| Stop | 15 | ∞ | 0.00 | 0.00 | −0.00 |
| 3 | 16 | 26.32 | 15.02 | 0.64 | −11.00 |
| 4 | 23 | −120.54 | 8.03 | −10.42 | −17.55 |
| 5 | 31 | 48.23 | 7.07 | 1.43 | −3.58 |

Single Lens Data

| Lens | First Surface | Focal Length |
|---|---|---|
| 1 | 1 | −187.86 |
| 2 | 2 | 139.05 |
| 3 | 4 | 284.02 |
| 4 | 6 | 113.93 |
| 5 | 8 | −13.75 |
| 6 | 10 | 42.45 |
| 7 | 11 | −14.93 |
| 8 | 13 | 31.86 |
| 9 | 16 | 20.48 |
| 10 | 18 | −20.82 |
| 11 | 20 | −72.84 |
| 12 | 21 | 20.39 |
| 13 | 23 | −26.29 |
| 14 | 25 | 195.59 |
| 15 | 27 | 26.24 |
| 16 | 29 | −60.20 |
| 17 | 31 | 120.99 |
| 18 | 33 | 29.20 |
| 19 | 35 | −46.03 |
| 20 | 37 | 0.00 |

THIRD NUMERICAL EXAMPLE

Unit: mm

Surface Data

| Surface No. | r | d | nd | vd | Effective Diameter |
|---|---|---|---|---|---|
| 1 | 114.411 | 1.70 | 2.00330 | 28.3 | 49.86 |
| 2 | 60.567 | 5.80 | 1.43875 | 95.0 | 46.43 |
| 3 | 1064.594 | 0.10 | | | 45.72 |
| 4 | 70.852 | 4.30 | 1.43875 | 95.0 | 44.95 |
| 5 | 678.817 | 0.10 | | | 44.61 |
| 6 | 54.512 | 5.00 | 1.74320 | 49.3 | 42.72 |
| 7 | 205.205 | (variable) | | | 41.67 |
| 8 | 1601.856 | 0.85 | 2.00330 | 28.3 | 22.32 |
| 9* | 14.612 | 5.51 | | | 18.09 |
| 10* | −28.455 | 4.00 | 1.84666 | 23.9 | 17.62 |
| 11 | −11.850 | 0.70 | 1.77250 | 49.6 | 17.69 |
| 12 | 59.483 | 0.10 | | | 17.47 |
| 13 | 31.287 | 2.37 | 1.84666 | 23.9 | 17.58 |
| 14 | 224.435 | (variable) | | | 17.34 |
| 15(stop) | ∞ | (variable) | | | 16.48 |
| 16* | 17.766 | 4.00 | 1.80610 | 33.3 | 19.46 |
| 17 | 147.491 | 1.96 | | | 18.95 |
| 18* | 23.764 | 0.80 | 1.84666 | 23.9 | 17.46 |
| 19 | 13.218 | 1.91 | | | 16.27 |
| 20 | 22.152 | 0.70 | 1.84666 | 23.9 | 16.23 |
| 21 | 13.513 | 4.40 | 1.48749 | 70.2 | 15.59 |
| 22 | −43.657 | (variable) | | | 15.40 |
| 23 | 183.785 | 0.90 | 1.83400 | 37.2 | 14.14 |
| 24 | 47.620 | (variable) | | | 13.81 |
| 25* | 22.638 | 4.30 | 1.49700 | 81.5 | 18.35 |
| 26 | −34.876 | 1.00 | 1.65412 | 39.7 | 18.26 |
| 27 | −63.439 | (variable) | | | 18.24 |
| 28 | ∞ | 2.46 | 1.51633 | 64.1 | 25.00 |
| 29 | ∞ | | | | 25.00 |
| Image Plane | ∞ | | | | |

Aspherical Surface Data

Ninth Surface

K = 4.50307e−001　A4 = −1.14719e−005　A6 = −1.43361e−006
A8 = 5.54045e−009　A10 = −1.32641e−011　A12 = 6.11510e−013
A3 = −3.84627e−005　A5 = 4.81817e−006　A7 = 1.16318e−007
A9 = −9.72389e−010　A11 = −3.88967e−012

Tenth Surface

K = 3.17352e+000　A4 = 2.64577e−005　A6 = 1.22019e−007
A8 = −4.06487e−009　A10 = 9.42193e−011　A12 = −1.17185e−013
A3 = −3.18296e−005　A5 = −1.31096e−006　A7 = 1.37255e−008
A9 = −4.18460e−010　A11 = −1.75071e−012

Sixteen Surface

K = −5.07238e−001　A4 = −1.04148e−005　A6 = −2.32836e−008
A8 = −5.43076e−010　A10 = 1.38976e−011　A12 = −2.42736e−014
A3 = −9.69139e−006　A5 = −1.04685e−006　A7 = 3.78237e−009
A9 = −1.15529e−010　A11 = −3.18882e−014

Eighteenth Surface

K = −1.66869e+000　A4 = 3.33240e−005　A6 = −5.71344e−008
A8 = 2.65590e−009　A10 = −2.77218e−011　A12 = 1.50613e−013
A3 = 7.45837e−006　A5 = 1.69503e−006　A7 = 8.02602e−009
A9 = 3.58947e−011　A11 = −6.10015e−013

Twenty-Fifth Surface

K = −8.68628e−001　A4 = 5.07244e−006　A6 = 2.29401e−008
A8 = −1.46346e−009　A10 = −2.09737e−011　A12 = 1.06517e−013
A3 = −2.16899e−005　A5 = −2.42519e−007　A7 = −3.22635e−009
A9 = 4.02634e−010　A11 = −1.32948e−012

Various Data

Zoom Ratio 18.02

| | Wide Angle | Intermediate | Telephoto |
|---|---|---|---|
| f | 8.00 | 46.88 | 144.20 |
| Fno | 1.85 | 3.60 | 4.00 |
| ω | 39.30 | 7.71 | 2.52 |
| Total lens length | 133.02 | 145.67 | 145.84 |
| BF | 1.14 | 1.14 | 1.14 |
| d7 | 1.80 | 34.01 | 46.60 |
| d14 | 40.51 | 7.68 | 1.88 |
| d15 | 9.21 | 6.68 | 1.88 |
| d22 | 2.10 | 5.25 | 3.26 |
| d24 | 10.76 | 12.32 | 24.02 |
| d27 | 14.55 | 25.63 | 14.10 |
| Entrance pupil position | 29.27 | 154.91 | 395.56 |
| Exit pupil position | −276.42 | −311.15 | 770.37 |
| Front principal point | 37.04 | 194.75 | 566.79 |
| Rear principal point | −6.86 | −45.74 | −143.06 |

Zoom Lens Unit Data

| Unit | First Surface | Focal Length | Lens Length | Front Principal Point | Rear Principal Point |
|---|---|---|---|---|---|
| 1 | 1 | 68.42 | 17.00 | 5.98 | −5.01 |
| 2 | 8 | −12.21 | 13.53 | 0.77 | −9.25 |
| stop | 15 | ∞ | 0.00 | 0.00 | −0.00 |

Unit: mm

| | | | | | |
|---|---|---|---|---|---|
| 3 | 16 | 28.08 | 13.77 | 0.84 | −9.78 |
| 4 | 23 | −77.30 | 0.90 | 0.66 | 0.17 |
| 5 | 25 | 36.65 | 5.30 | 0.84 | −2.70 |

Single Lens Data

| Lens | First Surface | Focal Length |
|---|---|---|
| 1 | 1 | −130.33 |
| 2 | 2 | 146.11 |
| 3 | 4 | 179.92 |
| 4 | 6 | 98.49 |
| 5 | 8 | −14.70 |
| 6 | 10 | 21.60 |
| 7 | 11 | −12.74 |
| 8 | 13 | 42.70 |
| 9 | 16 | 24.72 |
| 10 | 18 | −36.45 |
| 11 | 20 | −42.51 |
| 12 | 21 | 21.72 |
| 13 | 23 | −77.30 |
| 14 | 25 | 28.32 |
| 15 | 26 | −120.08 |
| 16 | 28 | 0.00 |

FOURTH NUMERICAL EXAMPLE

Unit: mm

Surface Data

| Surface No. | r | d | nd | vd | Effective Diameter |
|---|---|---|---|---|---|
| 1 | 92.969 | 1.70 | 2.00330 | 28.3 | 52.08 |
| 2 | 59.800 | 5.95 | 1.43875 | 95.0 | 48.62 |
| 3 | 1929.778 | 0.10 | | | 47.52 |
| 4 | 78.700 | 3.10 | 1.43875 | 95.0 | 46.13 |
| 5 | 282.171 | 0.10 | | | 45.94 |
| 6 | 49.144 | 4.95 | 1.59240 | 68.3 | 44.21 |
| 7 | 188.681 | (variable) | | | 43.63 |
| 8 | 747.697 | 0.85 | 1.88300 | 40.8 | 24.95 |
| 9* | 12.330 | 7.09 | | | 18.80 |
| 10 | −23.196 | 2.20 | 1.86148 | 25.7 | 18.24 |
| 11 | −14.265 | 0.65 | 1.74100 | 52.6 | 18.33 |
| 12 | 48.235 | 0.87 | | | 18.41 |
| 13 | 35.878 | 2.65 | 1.86148 | 25.7 | 18.81 |
| 14 | −180.146 | (variable) | | | 18.71 |
| 15(stop) | ∞ | (variable) | | | 15.53 |
| 16* | 15.341 | 4.50 | 1.81600 | 46.6 | 20.58 |
| 17 | 68.247 | 2.56 | | | 19.77 |
| 18* | 30.516 | 1.00 | 2.00330 | 28.3 | 17.24 |
| 19 | 12.334 | 1.65 | | | 15.52 |
| 20 | 16.120 | 0.80 | 1.80518 | 25.4 | 15.73 |
| 21 | 14.257 | 4.50 | 1.49700 | 81.5 | 15.36 |
| 22 | −46.529 | (variable) | | | 15.05 |
| 23 | −32.846 | 0.80 | 1.49700 | 81.5 | 14.30 |
| 24 | 22.339 | 0.80 | | | 14.00 |
| 25* | 64.931 | 1.10 | 1.94595 | 18.0 | 16.20 |
| 26 | 123.629 | 0.73 | | | 14.00 |
| 27 | 42.256 | 3.30 | 1.49700 | 81.5 | 14.85 |
| 28 | −17.288 | 0.60 | 1.83400 | 37.2 | 15.08 |
| 29 | −29.580 | (variable) | | | 15.57 |
| 30* | 25.967 | 1.60 | 1.48749 | 70.2 | 19.03 |
| 31 | 40.726 | 1.50 | | | 18.92 |
| 32 | 58.176 | 3.60 | 1.49700 | 81.5 | 19.00 |
| 33 | −20.415 | 0.65 | 1.83400 | 37.2 | 18.97 |
| 34 | −35.332 | (variable) | | | 19.19 |
| 35 | ∞ | 2.46 | 1.51633 | 64.1 | 25.00 |
| 36 | ∞ | | | | 25.00 |
| Image Plane | ∞ | | | | |

Unit: mm

Aspherical Surface Data

Ninth Surface

K = 1.58596e−001  A4 = −1.52844e−005  A6 = −4.34671e−007
A8 = −3.26381e−009  A10 = 1.34387e−010  A12 = −1.07687e−012
A3 = −5.03340e−006  A5 = −1.52001e−006  A7 = 1.28093e−007
A9 = −2.15316e−009  A11 = 1.19646e−011

Sixteenth Surface

K = −5.88182e−001  A4 = 1.15453e−005  A6 = −9.22663e−008
A8 = −2.97068e−010  A10 = 9.73227e−012  A12 = −1.49298e−014
A3 = 3.62048e−006  A5 = 6.89563e−007  A7 = 1.51516e−008
A9 = −1.04719e−010  A11 = −1.02623e−014

Eighteenth Surface

K = −9.71005e+000  A4 = 2.26524e−005  A6 = −3.82726e−007
A8 = −4.14006e−009  A10 = 9.25422e−012  A12 = 4.20947e−014
A3 = −1.90717e−006  A5 = 3.29802e−007  A7 = 4.33775e−008
A9 = 1.92989e−010  A11 = −1.29387e−012

Twenty-Fifth Surface

K = 9.64869e+000  A4 = 1.23604e−005  A6 = 1.06388e−007
A8 = 2.13424e−009  A10 = 2.03516e−010  A12 = 3.60290e−013
A3 = −7.96478e−006  A5 = −1.02589e−006  A7 = 1.45572e−009
A9 = −1.16599e−009  A11 = −1.49025e−011

Thirtieth Surface

K = −3.43086e−001  A4 = −3.97247e−006  A6 = 3.42025e−008
A8 = 2.28673e−009  A10 = −1.00956e−011  A12 = 8.08762e−014
A3 = 1.75381e−005  A5 = 4.84244e−007  A7 = −1.74013e−008
A9 = 5.68158e−012  A11 = −7.54153e−013

Various Data

Zoom Ratio 24.97

| | Wide Angle | Intermediate | Telephoto |
|---|---|---|---|
| f | 7.28 | 42.18 | 181.80 |
| Fno | 1.87 | 3.60 | 4.00 |
| ω | 41.90 | 8.58 | 2.01 |
| Total lens length | 140.39 | 152.98 | 157.19 |
| BF | 2.02 | 2.02 | 2.02 |
| d7 | 0.96 | 32.79 | 49.28 |
| d14 | 37.63 | 6.06 | 1.87 |
| d15 | 16.62 | 8.84 | 1.85 |
| d22 | 1.38 | 8.91 | 3.59 |
| d29 | 7.06 | 7.46 | 28.31 |
| d34 | 12.36 | 24.55 | 7.92 |
| Entrance pupil position | 27.11 | 137.47 | 482.71 |
| Exit pupil position | 171.92 | 2335.11 | 279.52 |
| Front principal point | 34.70 | 180.41 | 783.61 |
| Rear principal point | −5.26 | −40.15 | −179.77 |

Zoom Lens Unit Data

| Unit | First Surface | Focal Length | Lens Length | Front Principal Point | Rear Principal Point |
|---|---|---|---|---|---|
| 1 | 1 | 71.40 | 15.90 | 4.62 | −5.90 |
| 2 | 8 | −11.72 | 14.31 | 0.80 | −11.06 |
| Stop | 15 | ∞ | 0.00 | 0.00 | −0.00 |
| 3 | 16 | 27.95 | 15.01 | 0.54 | −11.11 |
| 4 | 23 | −128.05 | 7.33 | −9.70 | −16.05 |
| 5 | 30 | 45.57 | 7.35 | 2.44 | −3.08 |

Single Lens Data

| Lens | First Surface | Focal Length |
|---|---|---|
| 1 | 1 | −171.46 |
| 2 | 2 | 140.52 |
| 3 | 4 | 247.60 |
| 4 | 6 | 110.71 |
| 5 | 8 | −14.21 |
| 6 | 10 | 38.61 |

-continued

Unit: mm

| | | |
|---|---|---|
| 7 | 11 | −14.79 |
| 8 | 13 | 34.93 |
| 9 | 16 | 23.36 |
| 10 | 18 | −21.22 |
| 11 | 20 | −189.51 |
| 12 | 21 | 22.51 |
| 13 | 23 | −26.62 |
| 14 | 25 | 143.27 |
| 15 | 27 | 25.15 |
| 16 | 28 | −51.02 |
| 17 | 30 | 141.94 |
| 18 | 32 | 30.88 |
| 19 | 33 | −59.15 |
| 20 | 35 | 0.00 |

FIFTH NUMERICAL EXAMPLE

Unit: mm

Surface Data

| Surface No. | r | d | nd | vd | Effective Diameter |
|---|---|---|---|---|---|
| 1 | 83.562 | 1.70 | 2.00330 | 28.3 | 51.68 |
| 2 | 56.398 | 6.20 | 1.43875 | 95.0 | 48.61 |
| 3 | 394.511 | 0.10 | | | 47.23 |
| 4 | 88.215 | 3.10 | 1.43875 | 95.0 | 45.73 |
| 5 | 334.269 | 0.10 | | | 45.36 |
| 6 | 53.160 | 4.60 | 1.59240 | 68.3 | 43.20 |
| 7 | 260.787 | (variable) | | | 42.62 |
| 8 | 4745.268 | 0.85 | 1.88300 | 40.8 | 25.95 |
| 9* | 14.107 | 7.09 | | | 20.30 |
| 10 | −33.494 | 3.00 | 1.86148 | 25.7 | 19.74 |
| 11 | −15.886 | 0.65 | 1.74100 | 52.6 | 19.81 |
| 12 | 45.602 | 0.87 | | | 19.61 |
| 13 | 32.484 | 2.65 | 1.86148 | 25.7 | 19.98 |
| 14 | 176.422 | (variable) | | | 19.76 |
| 15(stop) | ∞ | (variable) | | | 15.94 |
| 16* | 14.929 | 4.50 | 1.81600 | 46.6 | 20.13 |
| 17 | 69.520 | 2.95 | | | 19.30 |
| 18* | 30.638 | 1.00 | 2.00330 | 28.3 | 16.52 |
| 19 | 11.991 | 1.96 | | | 14.86 |
| 20 | 16.897 | 0.80 | 1.80809 | 22.8 | 15.07 |
| 21 | 14.775 | 4.50 | 1.49700 | 81.5 | 14.74 |
| 22 | −64.881 | (variable) | | | 14.36 |
| 23 | −36.839 | 0.80 | 1.49700 | 81.5 | 14.30 |
| 24 | 51.149 | 0.80 | | | 14.00 |
| 25* | 138.113 | 1.10 | 1.94595 | 18.0 | 16.20 |
| 26 | 75.926 | 0.73 | | | 14.00 |
| 27 | 54.631 | 1.00 | 1.49700 | 81.5 | 15.37 |
| 28 | 52.329 | 2.50 | 1.81600 | 46.6 | 15.61 |
| 29 | −52.132 | (variable) | | | 15.78 |
| 30* | 21.501 | 2.00 | 1.48749 | 70.2 | 16.47 |
| 31 | 45.804 | 1.50 | | | 16.24 |
| 32 | −87.396 | 3.60 | 1.49700 | 81.5 | 16.19 |
| 33 | −19.375 | 0.65 | 1.83400 | 37.2 | 16.12 |
| 34 | −34.000 | (variable) | | | 16.33 |
| 35 | ∞ | 2.46 | 1.51633 | 64.1 | 25.00 |
| 36 | ∞ | | | | 25.00 |
| Image Plane | ∞ | | | | |

Aspherical Surface Data

Ninth Surface

K = 3.85868e−001    A4 = −1.19955e−005    A6 = −3.85955e−007
A8 = −3.54880e−009  A10 = 1.24378e−010    A12 = −1.01844e−012
A3 = −1.16222e−005  A5 = −1.54256e−006    A7 = 1.20701e−007
A9 = −2.02162e−009  A11 = 1.19748e−011

-continued

Unit: mm

Sixteenth Surface

K = −5.92251e−001   A4 = 1.02794e−005     A6 = −7.96373e−008
A8 = −5.94394e−010  A10 = 1.36279e−011    A12 = −3.71603e−014
A3 = 5.74452e−006   A5 = 5.33288e−007     A7 = 1.59397e−008
A9 = −1.25889e−010  A11 = 1.19434e−013

Eighteenth Surface

K = −1.18494e+001   A4 = 3.38818e−005     A6 = −6.01722e−007
A8 = 2.86983e−009   A10 = 6.80677e−012    A12 = 2.00545e−013
A3 = −4.48209e−006  A5 = 1.09558e−006     A7 = 3.19549e−008
A9 = −3.09651e−010  A11 = −2.00738e−012

Twenty-Fifth Surface

K = 2.34648e+001    A4 = 1.02882e−005     A6 = 7.81557e−008
A8 = 2.01591e−009   A10 = 1.40354e−010    A12 = −7.03481e−013
A3 = −1.14827e−005  A5 = −1.86495e−006    A7 = 3.17929e−008
A9 = −1.75337e−009  A11 = 5.68438e−012

Thirtieth Surface

K = −9.22698e−001   A4 = 3.15687e−006     A6 = 3.38340e−007
A8 = −2.76705e−009  A10 = 8.25106e−012    A12 = −2.40803e−013
A3 = 1.65294e−005   A5 = −9.80708e−008    A7 = −3.12862e−008
A9 = 3.41496e−010   A11 = 1.44036e−012

Various Data

Zoom Ratio 18.08

| | Wide Angle | Intermediate | Telephoto |
|---|---|---|---|
| f | 8.01 | 46.79 | 144.84 |
| Fno | 1.85 | 3.60 | 4.00 |
| ω | 39.10 | 7.75 | 2.52 |
| Total lens length | 136.44 | 152.87 | 154.65 |
| BF | 1.08 | 1.08 | 1.08 |
| d7 | 1.02 | 36.11 | 49.45 |
| d14 | 38.88 | 6.10 | 1.93 |
| d15 | 13.54 | 10.01 | 1.90 |
| d22 | 1.24 | 2.45 | 1.39 |
| d29 | 5.07 | 13.17 | 28.32 |
| d34 | 11.85 | 20.19 | 6.81 |
| Entrance pupil position | 28.70 | 156.78 | 383.39 |
| Exit pupil position | −519.29 | −344.75 | −234.16 |
| Front principal point | 36.59 | 197.24 | 439.05 |
| Rear principal point | −6.94 | −45.71 | −143.76 |

Zoom Lens Unit Data

| Unit | First Surface | Focal Length | Lens Length | Front Principal Point | Rear Principal Point |
|---|---|---|---|---|---|
| 1 | 1 | 75.19 | 15.80 | 4.74 | −5.79 |
| 2 | 8 | −13.01 | 15.11 | 1.06 | −10.81 |
| Stop | 15 | ∞ | 0.00 | 0.00 | −0.00 |
| 3 | 16 | 30.29 | 15.71 | −0.90 | −12.89 |
| 4 | 23 | 250.00 | 6.93 | 24.35 | 21.82 |
| 5 | 30 | 73.03 | 7.75 | 1.26 | −4.56 |

Single Lens Data

| Lens | First Surface | Focal Length |
|---|---|---|
| 1 | 1 | −178.51 |
| 2 | 2 | 149.15 |
| 3 | 4 | 272.10 |
| 4 | 6 | 111.79 |
| 5 | 8 | −16.02 |
| 6 | 10 | 32.51 |
| 7 | 11 | −15.83 |
| 8 | 13 | 45.83 |
| 9 | 16 | 22.47 |
| 10 | 18 | −20.18 |
| 11 | 20 | −175.07 |
| 12 | 21 | 24.68 |
| 13 | 23 | −42.96 |
| 14 | 25 | −179.81 |

-continued

| Unit: mm | | |
|---|---|---|
| 15 | 27 | −2920.06 |
| 16 | 28 | 32.35 |
| 17 | 30 | 80.95 |
| 18 | 32 | 49.22 |
| 19 | 33 | −55.12 |
| 20 | 35 | 0.00 |

The relationships between the above-described conditional expressions and the numerical examples are shown in Table 1.

TABLE 1

| Conditional Expression | Example | | | | |
|---|---|---|---|---|---|
| | 1 | 2 | 3 | 4 | 5 |
| (1) | 0.92 | 1.06 | 1.02 | 1.03 | 1.01 |
| (2) | 10.00 | 10.01 | 8.55 | 9.81 | 9.38 |
| (3) | 0.09 | 0.08 | 0.08 | 0.06 | 0.09 |
| (4) | 3.96 | 3.62 | 3.51 | 3.84 | 3.78 |
| (5) | 86.09 | 86.09 | 86.09 | 86.09 | 86.09 |
| (6) | — | 0.85 | 0.54 | 0.70 | 1.73 |
| (7) | — | 0.34 | 0.25 | 0.25 | 0.50 |
| (8) | 0.87 | 0.90 | 0.82 | 0.90 | 0.81 |

Next, with reference to FIG. 11, a description will be given of an example of a digital camera using a zoom lens in accordance with any of the embodiments described above as an imaging optical system. Referring to FIG. 11, the digital camera includes a camera body 20, an imaging optical system 21 formed by the zoom lens of the present invention, a solid-state image pickup element (photoelectric conversion element) 22, such as a CCD or a CMOS, for receiving an object image formed by the imaging optical system 21, a recording unit 23 (e.g., a tangible memory device) for recording the object image received by the solid-state image pickup element 22, and a viewfinder 24. The object image displayed on a display device (not shown) is viewed through the viewfinder 24. The display device is formed by a liquid crystal panel or the like, and displays the object image formed on the image pickup element 22.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-199921 filed Aug. 31, 2009, which is hereby incorporated by reference herein in its entirety.

What is claimed is:

1. A zoom lens comprising:
a first lens unit having a positive refractive power;
a second lens unit having a negative refractive power;
an aperture stop;
a third lens unit having a positive refractive power; and
a rear group including at least one lens unit,
wherein the first lens unit, the second lens unit, the aperture stop, the third lens unit, and the rear group are arranged along an optical axis in order from an object side to an image side,
wherein, during zooming from a wide angle end to a telephoto end, the first lens unit moves to the object side, the second lens unit moves to the image side, the aperture stop moves to the object side along a convex path, and the third lens unit moves to the object side, and wherein the following conditions are satisfied:

$$0.90 < |(R21b+R21a)/(R21b-R21a)| < 1.10$$

$$7.00 < f1/fw < 40.00$$

$$0.05 < |f2/ft| < 0.10$$

where R21a and R21b respectively represent radii of curvature of an object-side lens surface and an image-side lens surface of a lens closest to the object side in the second lens unit, fw and ft respectively represent focal lengths of the entire zoom lens at the wide angle end and the telephoto end, and f1 and f2 respectively represent focal lengths of the first lens unit and the second lens unit.

2. The zoom lens according to claim 1, wherein the following condition is satisfied:

$$2.00 < f3/fw < 6.00$$

where f3 represents a focal length of the third lens unit.

3. The zoom lens according to claim 1,
wherein the first lens unit includes, in order from the object side to the image side, a negative meniscus lens having a concave surface on the image side and three positive lenses each having a convex surface on the object side, and
wherein the following condition is satisfied:

$$70 < v1p$$

where v1p represents an average Abbe number of materials of the three positive lenses.

4. The zoom lens according to claim 1,
wherein the second lens unit includes, in order from the object side to the image side, a negative lens whose absolute value of a radius of curvature is smaller at the image side than at the object side and which has a concave surface on the image side, a positive meniscus lens having a concave surface on the object side, a biconcave negative lens, and a positive lens, and
wherein at least one lens surface in the second lens unit is aspherical.

5. The zoom lens according to claim 1, wherein the rear group includes, in order from the object side to the image side, a fourth lens unit having a negative refractive power and a fifth lens unit having a positive refractive power.

6. The zoom lens according to claim 5, wherein the following conditions are satisfied:

$$0.50 < |f4/ft| < 2.00$$

$$0.10 < f5/ft < 0.70$$

where f4 and f5 respectively represent focal lengths of the fourth lens unit and the fifth lens unit.

7. The zoom lens according to claim 1, wherein the rear group includes, in order from the object side to the image side, a fourth lens unit having a positive refractive power and a fifth lens unit having a positive refractive power.

8. The zoom lens according to claim 7, wherein the following conditions are satisfied:

$$0.50 < |f4/ft| < 2.00$$

$$0.10 < f5/ft < 0.70$$

where f4 and f5 respectively represent focal lengths of the fourth lens unit and the fifth lens unit.

9. The zoom lens according to claim 1, wherein the rear group is formed by a fourth lens unit having a positive refractive power, and the first, second, third and fourth lens units move for zooming.

10. The zoom lens according to claim 1, wherein the zoom lens forms an image in a photoelectric conversion element.

11. An image pickup apparatus comprising:
a zoom lens; and
a photoelectric conversion element configured to receive light passed through the zoom lens and to form an image on a surface thereof,
wherein the zoom lens includes
a first lens unit having a positive refractive power,
a second lens unit having a negative refractive power,
an aperture stop,
a third lens unit having a positive refractive power, and
a rear group including at least one lens unit,
wherein the first lens unit, the second lens unit, the aperture stop, the third lens unit, and the rear group are arranged in order from an object side to an image side,
wherein, during zooming from a wide angle end to a telephoto end, the first lens unit moves to the object side, the second lens unit moves to the image side, the aperture stop moves to the object side along a convex path, and the third lens unit moves to the object side, and
wherein the following conditions are satisfied:

$$0.90 < |(R21b+R21a)/(R21b-R21a)| < 1.10$$

$$7.00 < f1/fw < 40.00$$

$$0.05 < |f2/ft| < 0.10$$

where $R21a$ and $R21b$ respectively represent radii of curvature of an object-side lens surface and an image-side lens surface of a lens closest to the object side in the second lens unit, fw and ft respectively represent focal lengths of the entire zoom lens at the wide angle end and the telephoto end, and f1 and f2 respectively represent focal lengths of the first lens unit and the second lens unit.

12. The image pickup apparatus according to claim 11, wherein the following condition is satisfied:

$$\tan \omega w > 0.70$$

where $\omega w$ represents the maximum half angle of view of the zoom lens.

* * * * *